(12) United States Patent
Greer et al.

(10) Patent No.: US 8,691,104 B2
(45) Date of Patent: Apr. 8, 2014

(54) NANOTEXTURED SURFACES AND RELATED METHODS, SYSTEMS, AND USES

(75) Inventors: Harold F. Greer, Pasadena, CA (US); Julia R. Greer, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/350,734

(22) Filed: Jan. 13, 2012

(65) Prior Publication Data

US 2012/0181346 A1 Jul. 19, 2012

Related U.S. Application Data

(60) Provisional application No. 61/432,694, filed on Jan. 14, 2011, provisional application No. 61/529,123, filed on Aug. 30, 2011.

(51) Int. Cl.
*G01L 21/30* (2006.01)
*C23F 1/00* (2006.01)
*B82Y 40/00* (2011.01)

(52) U.S. Cl.
USPC ............ 216/59; 216/41; 216/42; 216/67; 977/887; 977/888; 264/293

(58) Field of Classification Search
USPC ............ 216/41, 42, 59, 67; 977/887, 888; 264/293
See application file for complete search history.

(56) References Cited

U.S. PATENT DOCUMENTS

| 8,216,483 | B2* | 7/2012 | Lim et al. ............. 216/41 |
| 2005/0208268 | A1 | 9/2005 | Extrand |
| 2009/0274580 | A1 | 11/2009 | Kornblit et al. |
| 2010/0129608 | A1 | 5/2010 | Low et al. |
| 2011/0077172 | A1* | 3/2011 | Aizenberg et al. ............. 506/16 |
| 2011/0229667 | A1* | 9/2011 | Jin et al. .................. 428/34.1 |
| 2012/0012557 | A1* | 1/2012 | David et al. ................ 216/71 |

FOREIGN PATENT DOCUMENTS

| KR | 10-2004-0086572 | 10/2004 |
| KR | 10-2010-0084971 | 7/2010 |
| KR | 10-2010-0092091 | 8/2010 |

OTHER PUBLICATIONS

PCT International Search Report mailed on Aug. 22, 2012 for PCT Application No. PCT/US2012/021390 filed on Jan. 13, 2012 in the name of California Institute of Technolgy et al.
PCT Written Opinion mailed on Aug. 22, 2012 for PCT Application No. PCT/US2012/021390 filed on Jan. 13, 2012 in the name of California Institute of Technolgy et al.
Liu, Y. et al. Super-hydrophobic surfaces from a simple coating method: a bionic nanoengineering approach. 17 Nanotechnology (2006) 3259.
Shirtcliffe, N. J. et al. Porous materials show superhydrophobic to superhydrophilic switching. Chem. Commun.(2005) 3135.
McHale, G. et al. Topography Driven Spreading. 93 Phys. Rev. Lett. (2004) 036102-1.
Cebeci, F.C. et al. Nanoporosity-Driven Superhydrophilicity: A Means to Create Multifunctional Antifogging Coatings. 22 Langmuir (2006) 2856.

(Continued)

*Primary Examiner* — Shamim Ahmed
(74) *Attorney, Agent, or Firm* — Steinfl & Bruno LLP

(57) ABSTRACT

A method of controlling wetting characteristics is described. Such method includes forming and configuring nanostructures on a surface where controlling of the wetting characteristics is desired. Surfaces and methods of fabricating such surfaces are also described.

37 Claims, 19 Drawing Sheets

(56) References Cited

OTHER PUBLICATIONS

Gemici, Z. et al. Hydrothermal Treatment of Nanoparticle Thin Films for Enhanced Mechanical Durability. 24 Langmuir (2008) 2168.
Jokinen, X.V. et al. Complex Droplets on Chemically Modified Silicon Nanograss. 20 Adv. Mater.(2008) 3453.
Parsons, G.N."ALD and Abrupt Wetting Transitions on Nonwoven Polypropylene and Woven Cotton Fabrics" ALD Conference 2009.
Liu, Y. et al. Can Superhydrophic Surfaces Repel Hot Water? 19 Journal of Materials Chemistry 5602-5611 (2009).
Zhang, H. et al. Engineering nanoscale roughness on hydrophobic surface—preliminary assessment of fouling behavior. Sci. Technol. Adv. Mater. 2005 6 236.
Kim, B.J. et al. Inductively coupled plasma etching of nano-patterned sapphire for flip-chip GaN light emitting diode applications. Thin Solid Films 516 (2008) 7744-7747.
Sainiemi, L. et al. Fabrication and fluidic characterization of silicon micropillar array electrospray ionization chip. Sensors and Actuators B. 132.(2008) 380.
Hulme, J.P. et al. Biomolecular Embossing. 128 J. Am. Chem. Soc. (2006) 390.
Kim, Y.S. et al. High density nanostructure transfer in soft molding using polyurethane acrylate molds and polyelectrolyte multilayers. 14 Nanotechnology (2003) 1140.
Chou, S.Y. et al. Imprint of sub-25 nm vias and trenches in polymers. Appl. Phys. Lett. 67 (1995) 3114.
Ye, M.Y.et al. DNA separation with low-viscosity sieving matrix on microfabricated polycarbonate microfluidic chips. Anal. Bioanl. Chem. 381 (2005): 820.
Shan, X.C. et al. Applications of micro hot embossing for optical switch formation. Sensors and Actuators A. 119 (2005) 433.
Telgarsky, X. M. et al. Comparison of Embossing Properties of Polycarbonate and Polystyrene for Deep Microstructures. Materials Forum 27 (2004) 100.
Microdevices Laboratory Annual Report 2008. www.jpl.nasa.gov. Retrieved Jan. 13, 2012.
Willis, P.A. et al. Monolithic photolithographically patterned Fluorocur™ PFPE membrane valves and pumps for in situ planetary exploration. Lab Chip 8 (2008) 1024.
Mayer, T.M. et al. Atomic-layer deposition of wear-resistant coatings for microelectromechanical devices. 82 Appl. Phys. Lett. 2883.
Putkonen, M. et al. Atomic layer deposition of metal fluorides through oxide chemistry. 21 J. Mat Chem 2011. (*in lieu of and heavily similar to* M. Putkonen, BeneqOy, Atomic Layer Deposition of Metal Fluoride Thin Films Through Oxide Chemistry ALD Conference 2009).
Lundgren, M. et al. Molecular Dynamics Study of Wetting of a Pillar Surface. Langmuir 2003, 19, 7127-9.
Jeong, S. et al. Fast and Scalable Printing of Large Area Monolayer Nanoparticles for Nanotexturing Applications. Nanoletters 2010, 10, 2989-2994.
Greer, J.R. et al. Size dependence of mechanical properties of gold at the micron scale in the absence of strain gradients. Acta Materialia, 53, 6, 2005.

* cited by examiner

Figure 8
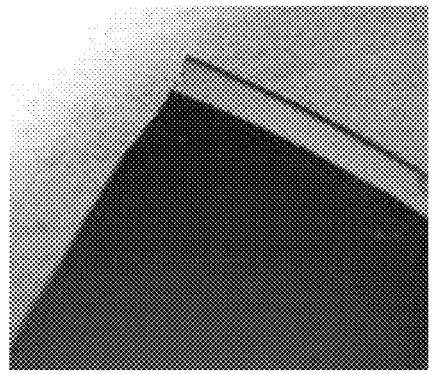
Figure 8A
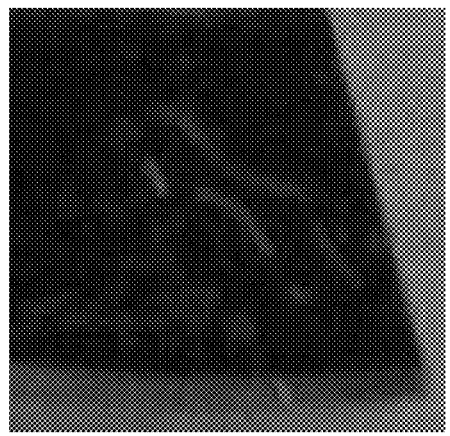
Figure 8B

Figure 9
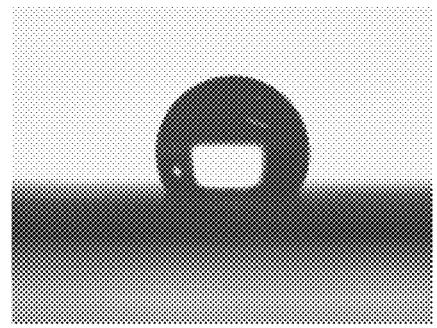
Figure 9A
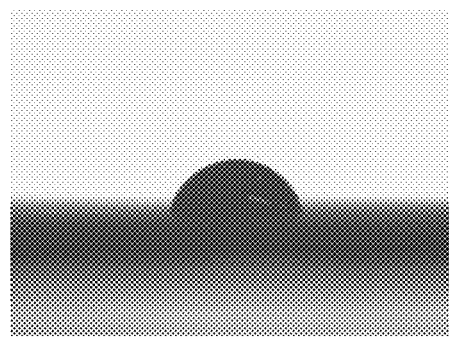
Figure 9B

Figure 10
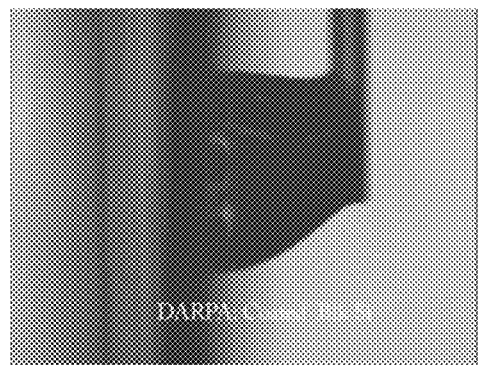
Figure 10A
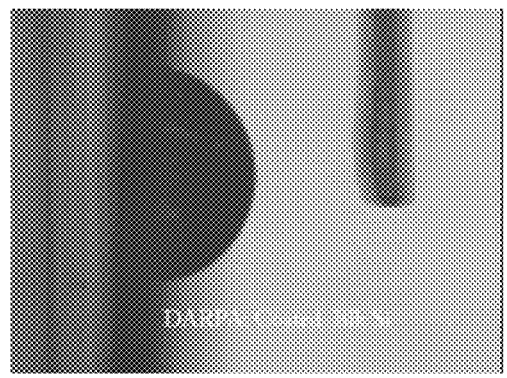
Figure 10B
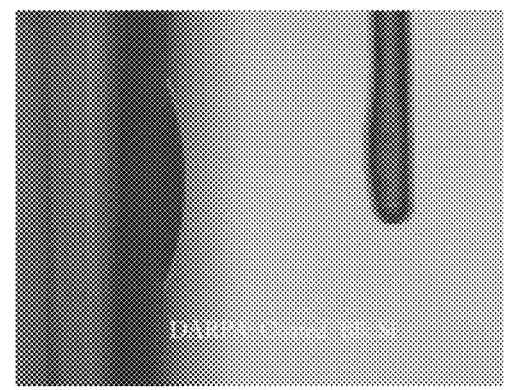
Figure 10C

NANOTEXTURED SURFACES AND RELATED METHODS, SYSTEMS, AND USES

CROSS REFERENCE TO RELATED APPLICATIONS

This application claims priority to U.S. provisional patent application 61/432,694 filed on Jan. 14, 2011 and to U.S. provisional patent application 61/529,123 filed on Aug. 30, 2011, both of which are incorporated herein by reference in their entirety.

STATEMENT OF GOVERNMENT GRANT

The invention described herein was made in the performance of work under a NASA contract, and is subject to the provisions of Public Law 96-517 (35 USC 202) in which the Contractor has elected to retain title. This invention was made with government support under Grant Number HR0011-10-1-0076 awarded by DARPA. The government has certain rights in the invention.

FIELD

The present disclosure relates to a nanotextured surface and related methods, systems and uses. In particular, the present disclosure relates to nanotexturing methods and systems and related surfaces configured to control fluidic properties of a fluid on the surface.

BACKGROUND

Fluidic properties of liquids or other fluids in connection with a surface have been object of research and investigation with particular reference to in areas in which the state of a liquid in connection with a surface is relevant for various industrial applications.

Despite several progresses in the ability to interfere with the state of a certain fluid on a determined surface, achievement of control of the fluid properties of liquids or other fluids has been challenging.

SUMMARY

Provided herein in accordance with several embodiments of the present disclosure are nanotextured surfaces and related methods, systems, and uses, that allow in several embodiments control of the fluidic properties of a fluid in connection with the surface.

According to a first aspect, a method to control wetting characteristics of a nanostructured surface is described, the method comprising: forming a nanostructured surface comprising a plurality of nanostructures, the nanostructured surface defining a nanostructured space between the nanostructures; and controlling structural parameters of the nanostructured surface to control wetting characteristics of the nanostructured surface with respect to a fluid adapted to interact with the nanostructured surface, the structural parameters including one or more of a nanostructure width, nanostructure inclination angle or curvature, nanostructure height, distance between nanostructures, roughness of nanostructure walls, and nanostructured bridging elements between the nanostructures, wherein, upon the controlling of the structural parameters of the nanostructured surface, the fluid interacts with the nanostructured surface according to a desired interaction between the fluid and the nanostructured surface, the desired interaction between the fluid and the nanostructured surface being selected between: a first wetting characteristic resulting in droplet formation on the nanostructured surface while substantially avoiding lodging of the fluid within the nanostructured space with subsequent expulsion or evaporation of the fluid from the nanostructured space, a second wetting characteristic resulting in initial lodging of the fluid within the nanostructured space with subsequent expulsion or evaporation of the fluid from the nanostructured space, or a third wetting characteristic resulting in initial lodging of the fluid within the nanostructured space with subsequent expulsion or evaporation of the fluid from the nanostructured space, the lodging occurring at a slower rate than a rate of the second wetting characteristic.

According to a second aspect, a configurable nanostructured surface is described, the configurable nanostructured surface including a plurality of nanostructures, the nanostructured surface defining a nanostructured space between the nanostructures, wherein the nanostructured surface is a controlled nanostructured surface in accordance with structural parameters of the nanostructured surface, the structural parameters including one or more of: a nanostructure width, nanostructure inclination angle or curvature, nanostructure height, distance between nanostructures, roughness of nanostructure walls, and nanostructured bridging elements between the nanostructures, and wherein, upon control of the structural parameters of the nanostructured surface, the nanostructured surface is adapted to assume: a first fluid-contacting configuration resulting in droplet formation on the nanostructured surface while substantially avoiding lodging of the fluid within the nanostructured space with subsequent expulsion or evaporation of the fluid from the nanostructured space, a second fluid-contacting configuration resulting in initial lodging of the fluid within the nanostructured space with subsequent expulsion or evaporation of the fluid from the nanostructured space, or a third fluid-contacting configuration resulting in initial lodging of the fluid within the nanostructured space, the lodging occurring at a slower rate than a rate of the second fluid-contacting configuration with subsequent expulsion or evaporation of the fluid from the nanostructured space.

According to a third aspect, a method for fabricating a nanostructured surface is described, the method comprising: providing a substrate; depositing an etch mask on the substrate, the etch mask comprising nanoparticles; etching the substrate under etching conditions to form a plurality of nanostructures, and removing the etch mask to expose the plurality of nanostructures, a size of the nanoparticles being selected based on desired structural parameters, thus obtaining a nanostructured, wherein: the structural parameters include one or more of a nanostructure width, nanostructure inclination angle or curvature, nanostructure height, or distance between nanostructures, and the structural parameters are selected based on a desired contact angle of a fluid with the nanostructured surface.

The surfaces and related compositions, devices, methods and systems herein described can be used in connection with applications wherein control of fluidic properties of a fluid on a surface are desired. Exemplary applications comprise windshields, lenses, boat hulls, aircrafts, and goggles, as well as mirrors as well as heat exchangers, steam turbines, and hydroelectric turbines and additional applications wherein control of an amount and state of a fluid on a surface is desired which are identifiable by a skilled person.

The details of one or more embodiments of the disclosure are set forth in the accompanying drawings and the detailed description and examples below. Other features, objects, and advantages will be apparent from the detailed description, examples and drawings, and from the appended claims.

BRIEF DESCRIPTION OF THE DRAWINGS

The accompanying drawings, which are incorporated into and constitute a part of this specification, illustrate one or more embodiments of the present disclosure and, together with the detailed description and the examples, serve to explain the principles and implementations of the disclosure.

FIG. 5 (bottom) shows a picture illustrating the clarity of the nanotextured boro silicate glass having a surface roughness of 10.4 nm, corresponding to FIG. 4 (bottom).

FIG. 8 shows pictures of a nanostructured black silicon surface with different coatings. FIG. 8A shows a picture of the nanostructured surface coated by ALD with a precursor TTIP (titanium tetraisopropoxide) deposited at 350° C. to give a polycrystalline $TiO_2$ layer. FIG. 8B shows a picture of the nanostructured surface coated by ALD with a precursor TTIP (titanium tetraisopropoxide) deposited at 200° C. to give an amorphous $TiO_2$ layer.

FIG. 9A-B shows the same nanostructured surface pictured in FIG. 8, coated with a fluoropolymer is an exemplary control of a rate of wetting. The photograph in FIG. 9B was taken approximately three seconds after the photograph shown in FIG. 9A.

FIG. 10 shows pictures of a droplet being place on a fluoropolymer-coated black silicon surface, a super high wettability (e.g. superhydrophobic) surface with a rate of absorption affected compared to the uncoated black silicon shown in FIG. 9. The droplet is sticky even on vertical surfaces.

FIG. 15 shows illustrations of two-dimensional cross-sections of exemplary three-dimensional nanostructures of the disclosures.

FIG. 16 shows a schematic representation of two-dimensional cross-sections of three-dimensional nanostructures having wall roughness.

DETAILED DESCRIPTION

Figure 1:
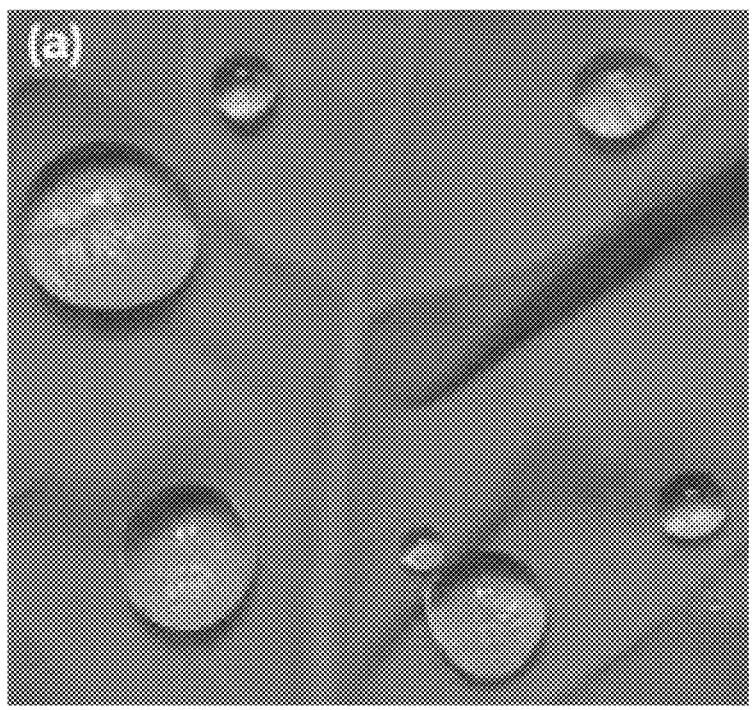
FIG. 1 shows pictures illustrating a nanostructured coating having a low wettability (e.g. superhydrophobic) according to embodiments herein described.
Figure 1:
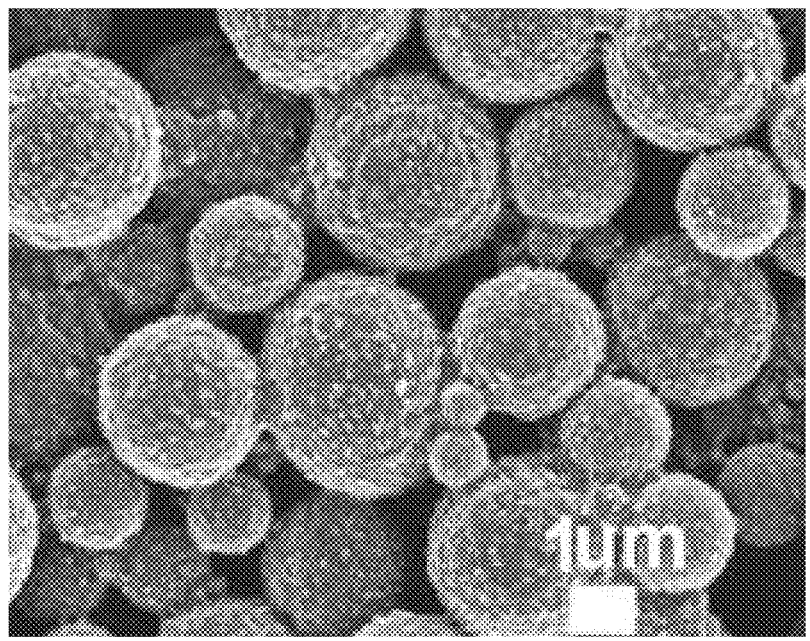

According to an embodiment of the present disclosure, a surface configured to control fluidic properties of a fluid, including but not limited to, a liquid, a condensate a vapor, and/or mixture thereof are described.

The term "fluid" as used herein refers to a substance the continually deforms and/or flows under an applied stress. In particular, fluids comprise liquids and gases having a corresponding liquid form. Accordingly, in the sense of the disclosure a fluid can comprise any subset of state of a matter, such as one or more of a liquid, a gas, and in particular a vapor, a condensate, a plasma, and any mixture thereof. A fluid can also comprise a pure substance or a mixture of substances. For example, a fluid can comprise water or water and ethylene glycol, or water and ethylene glycol and methanol. Mixtures of substances can have individual substances being any one of liquid, gas, vapor, condensate, plasma, and any mixtures thereof. The above examples are not intended to be limiting. In particular, gas in the sense of the present disclosure indicates a compressible fluid which will not conform to the shape of its container but it will also expand to fill the container. Gases herein described include vapors and other compressible fluids that have a corresponding liquid form under appropriate conditions. For example, a vapor is a substance in the gas phase at a temperature lower than its critical point. This means that the vapor can be condensed to a liquid or to a solid by increasing its pressure without reducing the temperature. A vapor may co-exist with a liquid (or solid). When this is true, the two phases will be in equilibrium, and the gas pressure will equal the equilibrium vapor pressure of the liquid (or solid) as will be understood by a person skilled person.

Fluidic properties in the context of the present disclosure refer to properties associated with interactions of a fluid with a solid surface in particular able to determine the location of the fluid with respect to the surface. Fluidic properties able to determine location of the fluid on the surface comprise surface tension of the liquid or liquid form of the fluid. In particular the surface tension of a liquid can depend on a type liquid, a type of surface with which the liquid makes contact, and the combination thereof.

In some embodiments, the fluidic properties to be controlled are in connection with increasing or decreasing wettability of a surface. A surface which tends to attract a liquid has a higher wettability than a surface and which tends to repel a liquid which has a lower wettability. When the liquid is water, the terms hydrophobic and hydrophilic can be used, a hydrophobic surface being a surface having a lower wettability and a hydrophilic surface being a surface having a higher wettability. One skilled in the art would know that that wettability of surface can refer to liquids other than water.

In some embodiments, the fluidic properties to be controlled are in connection with increasing or decreasing hydrophobicity or hydrophilicity of a surface. A hydrophilic surface is a surface which tends to attract water and a hydrophilic surface is a surface which tends to repel water. In the case of surfaces having a super high wettability (e.g. superhydrophobic), condensation of a vapor can be minimized altogether.

In the embodiments herein described, fluidic properties associated with the location of a fluid with respect to the surface can refer to a contact angle that a droplet of the fluid, if the fluid is a liquid, or the liquid form of the fluid if the fluid is gas forms with the surface and/or can refer to an interaction or lack thereof of a vapor and/or a condensate with a surface based on surface energy.

Figure 7:
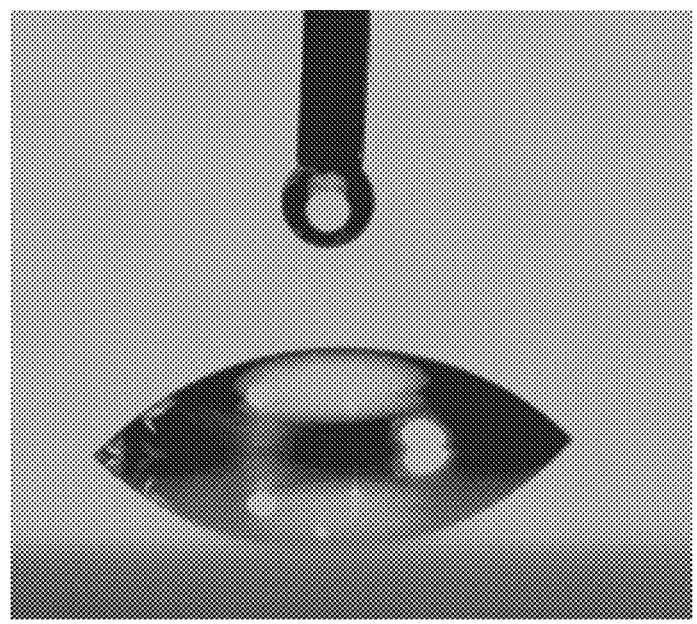
FIG. 7 shows a picture and a schematic representation of a method of measuring water contact angle with a surface. The tube at top of the left image can be used to apply a water droplet to a wafer. In this example, the contact angle is small, indicating affinity for wettability due to high surface energy of the solid.
Figure 7:
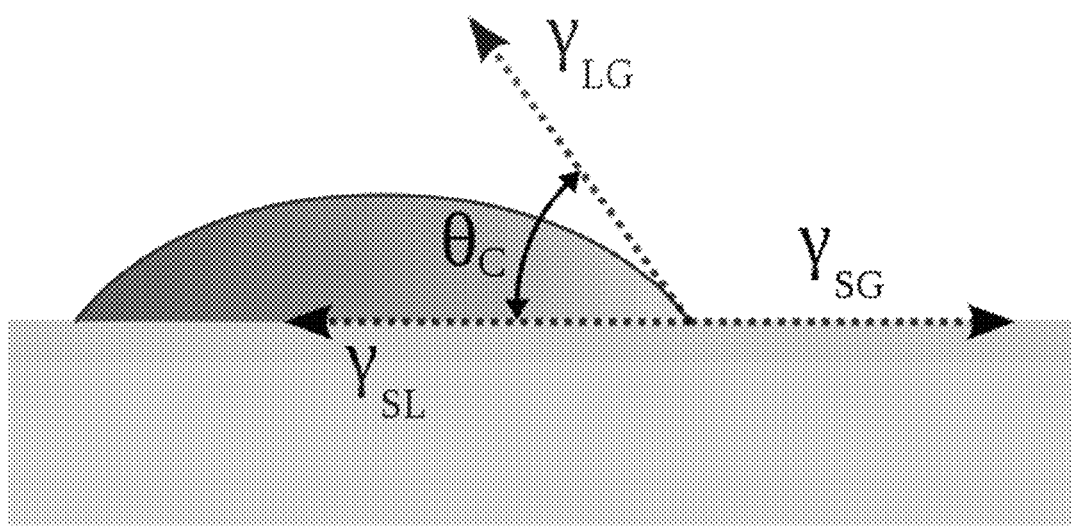
Figure 11:
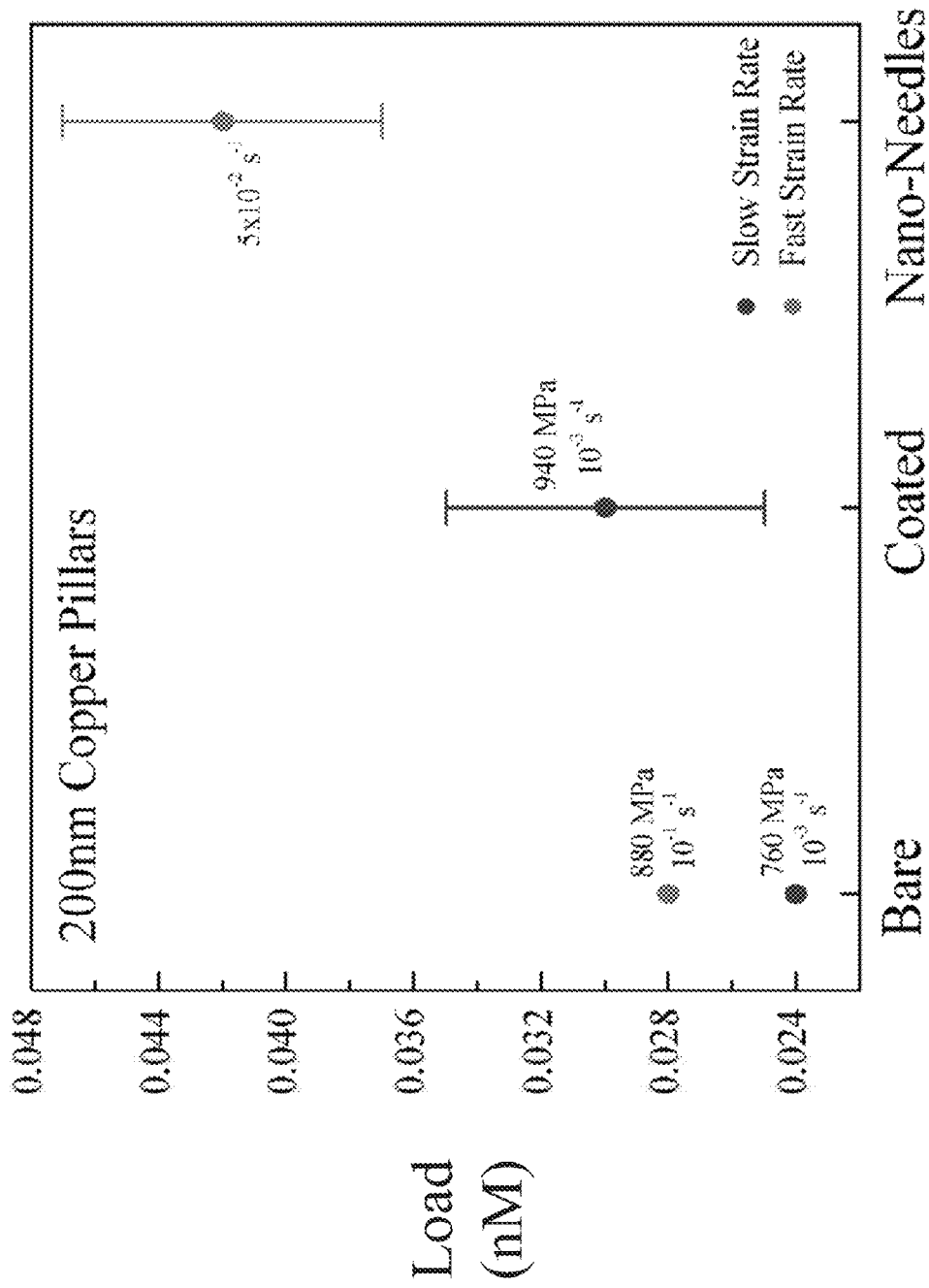
FIG. 11 shows metallic template testing and copper pillar template.
Figure 12:
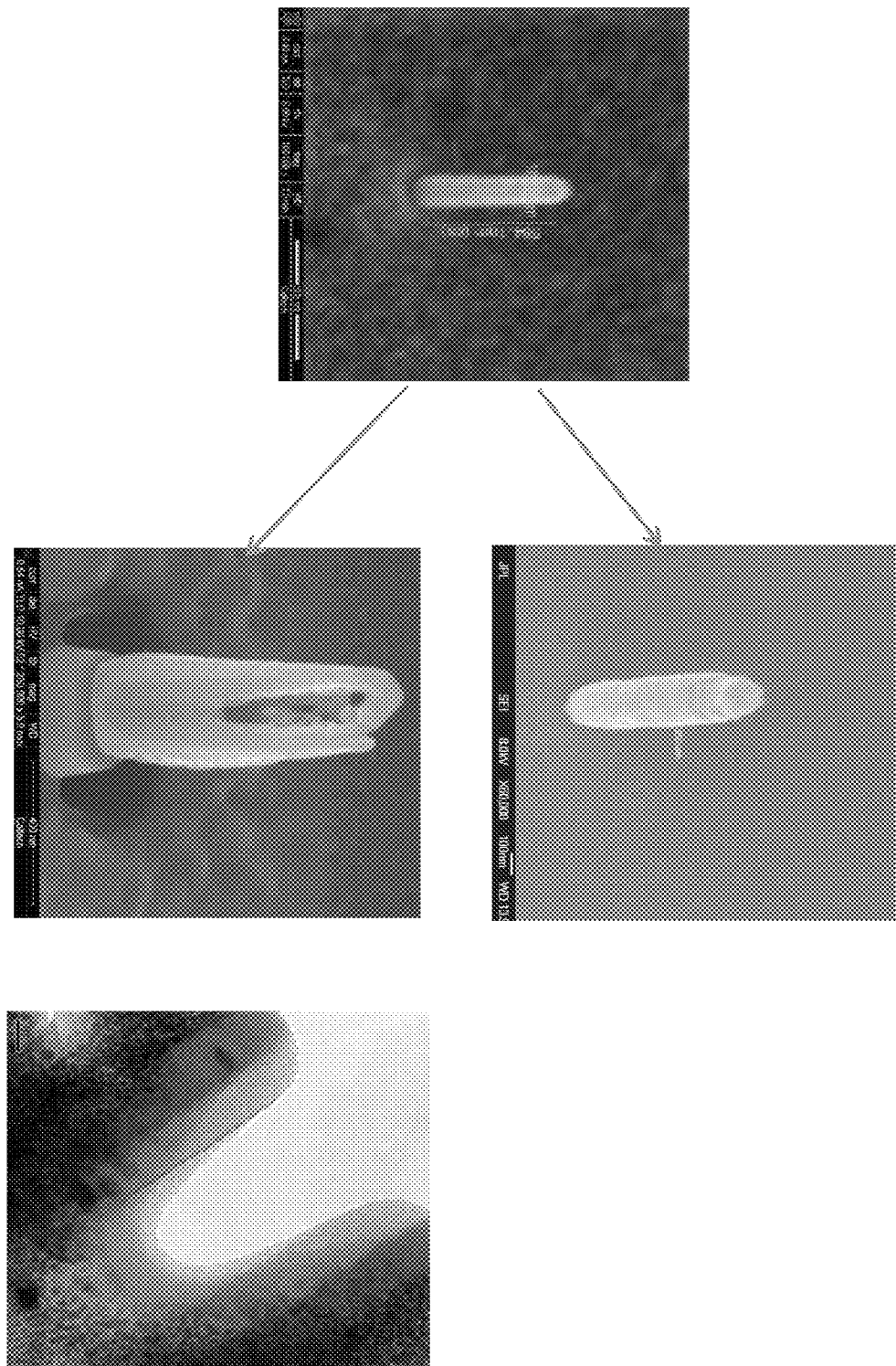
FIG. 12 shows how atomic layer deposition can be used to strengthen metallic nanostructures but can be utilized to fabricate copper pipes by adjusting deposition temperature.
Figure 13:
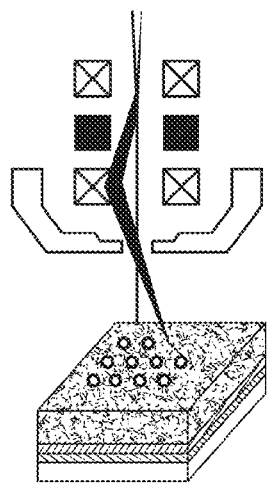
FIG. 13 is a schematic showing a method comprising steps for obtaining an array of structures.
Figure 13:
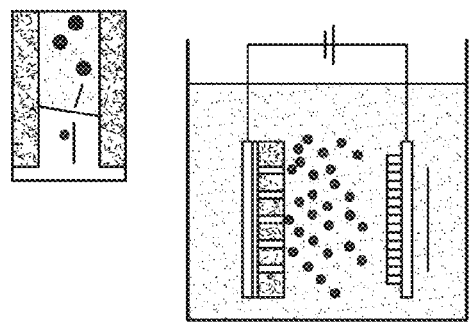
Figure 13:
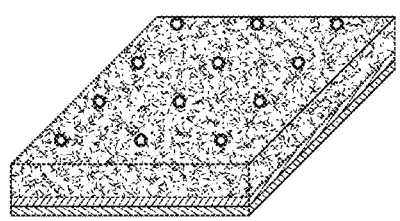
Figure 13:
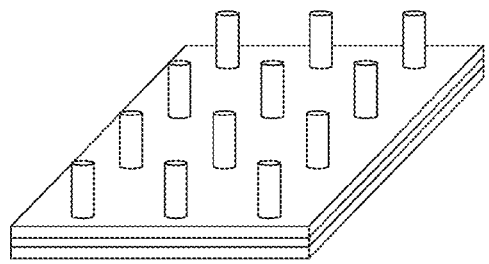
Figure 14:
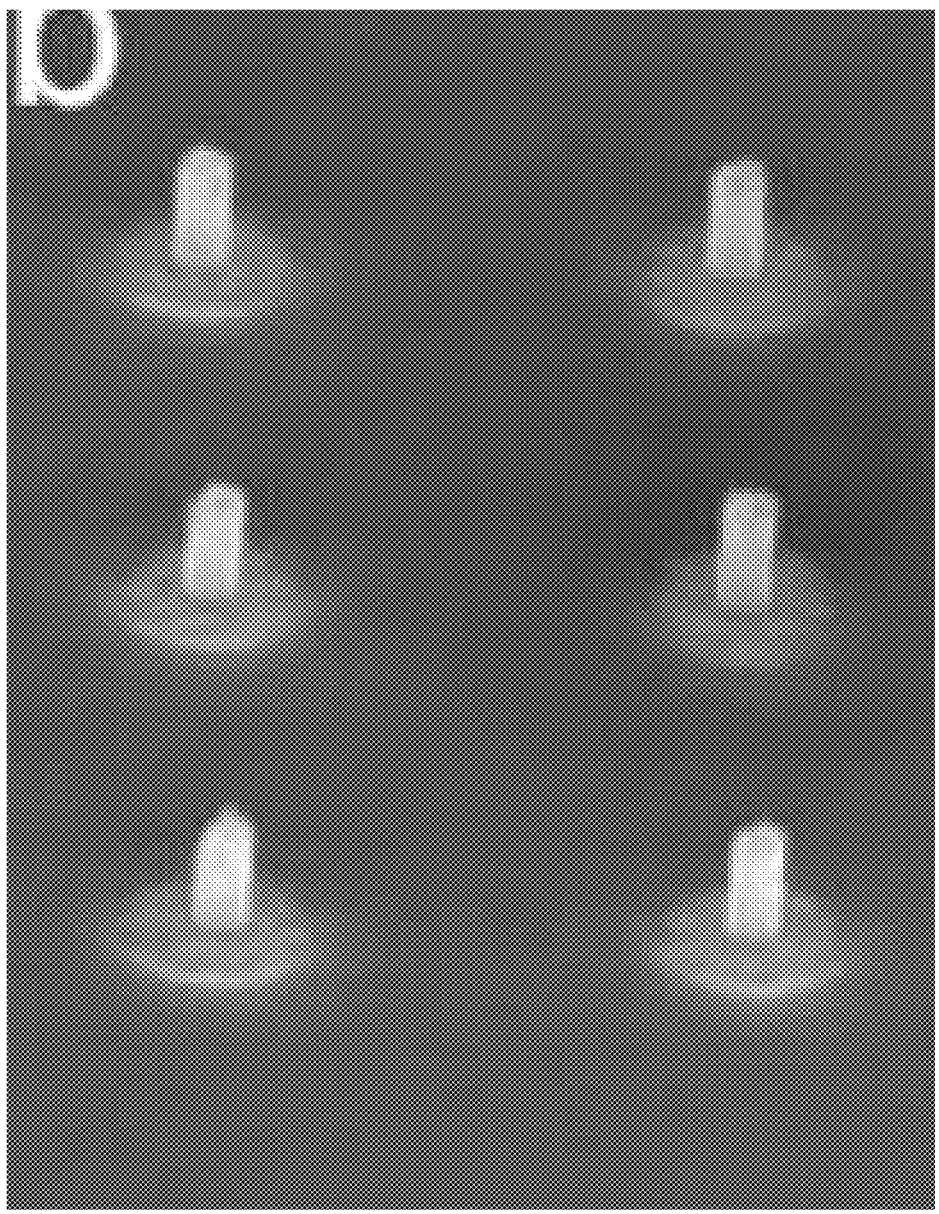
FIG. 14 shows an array of nanostructures fabricated using the step shown in FIG. 13.
Figure 15A:
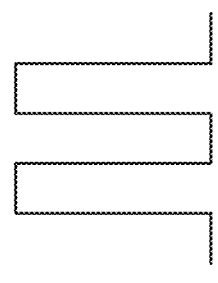
FIG. 15A illustrates a substantially pillar-shaped nanostructure.
Figure 15B:
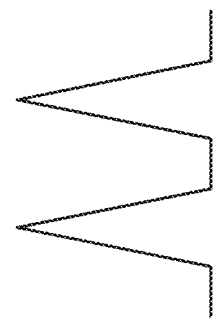
FIG. 15B illustrates a substantially pointed, cone-shaped nanostructure.
Figure 15C:
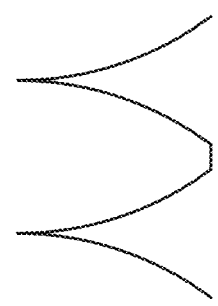
FIG. 15C illustrates a substantially pointed, cuspidal nanostructure.
Figure 15D:
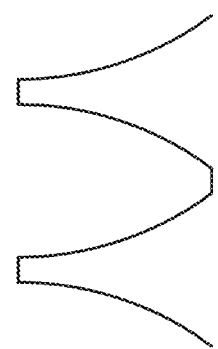
FIG. 15D illustrates a substantially pillar-shaped nanostructure having concave walls.
Figure 15E:
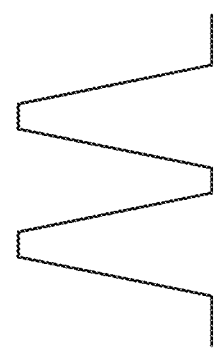
FIG. 15E illustrates a substantially pillar-shaped nanostructure having a base width which is wider than a width at a distal end of the nanostructure.

The term "contact angle" as used herein refers to an angle formed between a solid/liquid interface and a liquid/vapor interface. In particular, a contact angle is an angle formed between a fluid and a macroscopically flat surface to which the droplet makes contact. FIG. 7 shows an example of a contact angle ($\theta_c$). A contact angle can be the result of interface/surface tensions between a liquid and a solid surrounded by vapor and can be measured according to the Young relation.

The term "liquid droplet" as used herein refers to a small amount of liquid that can be used to characterize the wettability of a surface, for example, small enough that the surface forces dominate the shape of the surface. The term "microscopic surface area" as used herein refers to surface area measured on a microscopic level. For example, for a fixed macroscopic surface area, a microscopic surface area can vary and can be controlled by nanotexturing the surface, for example, by providing nanostructures on the surface, thus providing an increased microscopic surface area. In particular, according the present disclosure, a higher microscopic surface area can be achieved by a higher number of nanostructures per unit area thus obtaining a higher microscopic surface area over a fixed macroscopic surface area. The size of the textures that affect the properties of a liquid droplet can also be micron-sized and therefore the size of the nanotextures referred to in this disclosure should not be considered to be limited to less than 1000 nm in size.

The term "surface energy" as used herein refers to an affinity of a surface for a particular liquid. The affinity can be a result of wettability (e.g. hydrophobicity, or hydrophilicity), molecular structure, porosity, and/or surface roughness/substructure.

In particular in some embodiments by controlling the contact angle that a liquid makes with a surface, wettability of the surface can be controlled. In some embodiments, the higher the specific surface area of a surface, the greater an effect on a contact angle of a fluid with the surface. For example, for a particular high wettability (e.g. hydrophilic) surface having a low contact angle with a fluid, providing the surface with nanostructures, thus providing the surface with an increased specific surface area with respect to the surface without nanostructures, can provide the surface with super high wettability (e.g. becoming superhydrophilic), having a lower contact angle with the fluid.

The term "specific surface area" as used herein refers to a total surface area per unit mass, cross-sectional area or another defined area. For example, two surfaces can have different specific surface areas over a same macroscopic surface area, for example, by providing a surface with roughness. A first surface having a roughness which is higher than a second surface is expected to have a higher specific surface area than the second surface.

The term "surface roughness" as used herein refers to a measure of peak and valleys on a surface and a frequency with which they are present is differentiated from wall roughness as defined herein. Surface roughness can be expressed in $R_a$ (or RMS), a root means square of roughness of a surface. $R_a$ is a measure of an average peak to valley distance on a surface. The higher an $R_a$ for a given surface, the rougher the surface.

With reference to nanostructural features, the term "height" as used herein refers to a height of a nanostructure from its base at a surface to its distal end.

With reference to nanostructural features, the term "distance" as used herein refers to a distance between nanopillars, the distance can be measured from the center of the base of one nanostructure to the center of the base of another nanostructure; or from the center of the distal end of one nanostructure to the center of the distal end of another nanostructure.

With reference to nanostructural features, the term "diameter" as used herein refers to a largest distance across the base of pillar. The term "diameter" is interchangeably with the term "width" with reference to nanostructural features as the nanostructure bases need not be circular, but can also be squares rectangles or irregularly shaped.

The term "transparent" as used herein refers to an ability of light of a particular wavelength range to pass through a material/surface without scattering the light or with minimal scattering of the light. Accordingly, some amount of optical loss due to light scattering can lead to a translucent material/surface, which is a subset of transparent materials/surfaces according to the present disclosure. The term "transparency" as used herein refers to a feature of a material/surface having the ability to allow light to pass through the material/surface without scattering the light or with minimal scattering of the light. Thus, the term transparency can be used with reference to light of a particular range of wavelengths, for example, visible light, infrared light, ultraviolet light, etc.

With reference to nanostructural features, the term "wall roughness" as used herein refers to a roughness along walls of nanostructures inclusive of all the surfaces of the nanostructures and is distinguishable from the term "surface roughness". Wall roughness can be a result of different physical states of a surface material, for example an amorphous versus a crystalline form of a material, the amorphous form having a more smooth surface and the crystalline form having a rougher surface resulting from crystallites. As another example, wall roughness can be a result of porosity of a material, a higher porosity leading to a rougher surface than a lower porosity material. As another example, wall roughness can be a result of a applying a coating to the wall coating comprising particles which leads to surface roughness.

In some embodiments, a surface having a low wettability (e.g. hydrophobic) can be provided with super low wettability (e.g. becoming superhydrophobic) by forming nanostructures on the surface and in some embodiments, a surface hydrophilic surface can become superhydrophilic by forming nanostructures on the surface.

In particular, in some exemplary embodiments, the nanostructures can make the wetting or lack thereof, of a surface "super-" while a type of surface energy can make the surface hydrophobic or hydrophilic. Thus a surface being either hydrophobic or hydrophilic which is textured to provide nanostructures, can provide a surface which is superhydrophobic or superhydrophilic and is exemplified in Example 6.

The term "nanostructures" as used herein refers to a column-like structure which protrudes from a surface to which the column-like structure is substantially perpendicular. A nanostructure in the sense of the present disclosure encompasses, for example, nanoneedles, nanopillars, and nanocones. Nanostructures of the disclosure, comprising nanopillars, nanoneedles, and nanocones, can be perpendicular to the surface from top to bottom of the nanopillar (inclination angle≈θ) or can be a cone-shaped or needle-like structure having a wider end at the surface from which it protrudes and coming to a point away from said surface (inclination angle≠θ). A nanostructure according to the present disclosure can range in size from 5 nm to 100 microns.

More particularly with respect to nanopillars, nanopillars can encompass nanopillar-shaped structures wherein substantially perpendicular surfaces of the nanopillars are concave or convex surfaces.

More particularly with respect to nanocones, nanocones can encompass nanocone-shaped structures wherein substantially inclined surfaces of the nanocones are concave or convex surfaces. Wettability (e.g. hydrophobicity or hydrophilicity) of a surface can be analyzed by measuring a contact angle of a water droplet on the surface. A surface having a high contact angle between approximately 90-150° can be defined herein as having low wettability (e.g. a hydrophobic surface). A surface having a higher contact angle between approximately 150-180° can be defined herein as having super low wettability (e.g. a superhydrophobic surface). A surface having a low contact angle between approximately 20-60° can be classified as having high wettability (e.g. a hydrophilic surface). A surface having a lower contact angle between approximately 0-20° can be classified as having super high wettability (e.g. a superhydrophilic surface).

In some embodiments, fluidic properties of a liquid can be controlled by a type of material of which the surface is comprised and nanostructural features of the surface. In particular, a surface comprising nanostructures can be used to provide the surface with control fluidic properties. More particularly, the configuration of the nanostructures can provide the surface with control of fluidic properties based on an average height ($h_{avg}$), an average inclination angle ($i_{avg}$), and an average distance ($d_{avg}$) between the nanostructures.

In some embodiments, efficacy of particular configuration of nanostructures, and in particular, nanostructures of a particular average height ($h_{avg}$), average inclination angle ($i_{avg}$), and having average distance ($d_{avg}$) between one another, can be estimated by measuring contact angle that a surface comprising the nanostructures makes with a liquid and comparing this contact angle to a desired contact angle.

Contact angle measurements can be performed by taking photographs of a droplet on surface with a high zoom camera and using suitable computer software to measure a contact angle between a solid sample's surface below the droplet and the tangent of the droplet's ovate shape at the edge of the droplet.

In some embodiments the surface is a rigid surface. A rigid surface in the sense of the present disclosure comprises materials which cannot readily be deformed by an applied pressure. For example, the rigid surface can comprise a metal, ceramics, sapphire, fluoride optics, and glass. Metals according to the present disclosure can include, but are not limited to a transition metal or transition metal alloy; any p-block metal or p-block metal alloy; and a semiconductor or semiconductor alloy. Glass according to the present disclosure include but are not limited to boro-, fluoro-, phospho-, borophospho-, and alumino-silicate, other types of silicon-based glass, and metallic glasses.

In some embodiments, the liquid for which control of fluidic properties is desired is water. Control of fluidic properties of water can be useful for a number of applications. For example, minimizing optical surface fogging is important in situations where visibility is desirable.

Such control can be used in connection with providing an anti-fogging effect, for example, for a window, a windshield, goggles, mirrors, and lenses or a fogging effect.

In some embodiments, the control of a contact angle that a liquid makes with a surface can also be used in connection with providing an anti-fouling effect on a surface, for example, on a boat hull.

Commonly available anti-fogging treatments typically involve coatings and can function by modulating a surface wettability (e.g. hydrophilicity) of an optical element.

Figure 3:
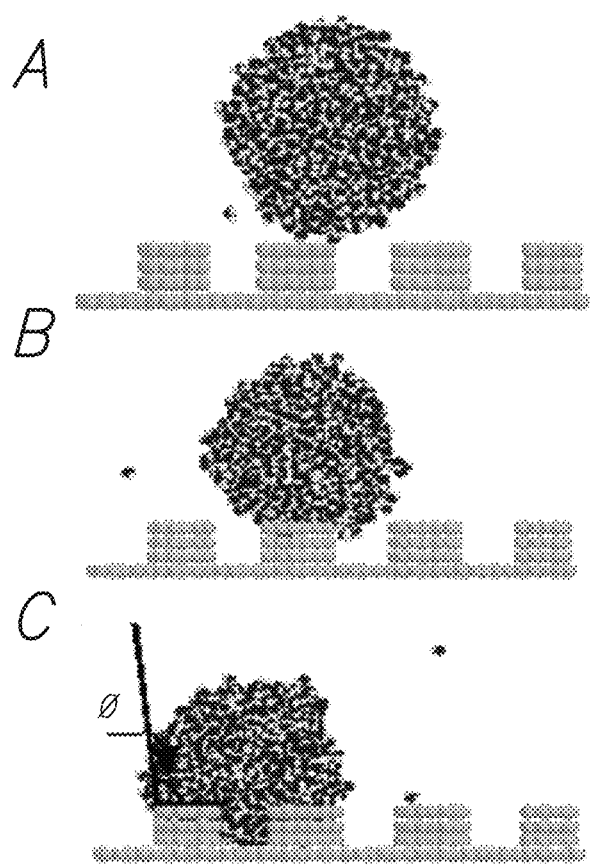
FIG. 3 shows a schematic illustration of simulation of surface wetting according to embodiments herein described. In particular, different stages of contacting of a liquid droplet with a nanotextured surfaces are schematically shown in panels (a) to (c).

Fogging can be minimized by either promoting wetting of condensates to avoid a formation of light scattering droplets or by decreasing the surface wettability (e.g. increasing hydrophobicity), causing water droplets to bead up and rapidly run off. FIG. 3 shows a simulation of wetting [23]. Wettability of a surface can be altered by depositing thin films of varying wettability (e.g. a hydrophilic or a hydrophobic film) or by intentionally increasing its roughness in a controlled fashion through incorporating nanostructures that promote or minimize a spreading of water (See refs [1]-[8]).

In some embodiments, surface roughness has been shown to increase or decrease wettability (e.g. to enhance hydrophobicity or hydrophilicity) by creating a larger contact area between a surface and a liquid droplet. This change in contact angle changes dynamics of a liquid-gas-solid equilibrium and can enhance wettability, or lack thereof. Thus, a slightly wettable (e.g. slightly hydrophobic) surface can become a super wettable surface (e.g. becoming superhydrophobic) through addition of roughness or nanoscale surface textures, and liquids can attain a meta-stable state where droplets are suspended, creating an additional liquid/solid/gas interface at the bottom of the droplet [3], [9]. FIG. 1 shows a surface with a nanostructured coating which has a super high wettability (e.g. superhydrophobic) simulating a lotus leaf from reference [8].

The term "resistance" as used herein refers to a rate at which wetting of a surface occurs for a particular fluid. For example, two different surfaces can have equal wettability with respect to a particular fluid, however, if one the surfaces has a greater resistance toward the fluid then it can have a lower rate of wettability, even though a final state of wetting for the surfaces can be the same.

Figure 16A:
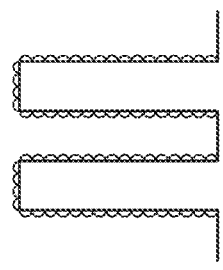
FIG. 16A shows a substantially pillar-shaped nanostructure having wall roughness.

In some embodiments, a nanostructuring of a surface can result in an increased resistance between the surface and a fluid which contacts the surface. Additionally, roughness on a nanostructure can provide additional resistance between the surface and the fluid. Examples of roughness on a nanostructure, and in particular on walls of a nanostructure are shown schematically in FIG. 16. Wall roughness/nanostructure roughness can be a result of different physical states of a surface material, for example an amorphous versus a crystalline form of a material, the amorphous form having a more smooth surface and the crystalline form having a rougher surface resulting from crystallites; wall roughness can be a result of porosity of a material, a higher porosity leading to a rougher surface than a lower porosity material; and wall roughness can be a result of applying a coating to the wall coating comprising particles which leads to surface roughness.

A distance between nanostructures, a height of nanostructures, and a width of nanostructures can create various resistances to eliminating the space created by the height, distance, width, and inclination angle/curvature. Thus by controlling height, distance, width, and inclination angle/curvature, resistance of the surface to a fluid can be controlled to result in different wetting characteristics. Accordingly, while FIG. 15 shows exemplary shapes of nanostructures, any shape which provides a resistance of a surface to a liquid can be used to control wettability characteristics of a surface with respect to a particular liquid.

In some embodiments, a substantially flat surface (non-nanostructured) having a lower f wettability on a flat surface can exhibit increased wettability by nanostructuring the surface according to embodiments of the disclosure. For example, if a substrate material inherently has a low wettability and thus substantially avoids wetting, providing the surface with nanostructures can increase its wettability and accordingly, a rate of wetting can be controlled. Additionally, by providing a surface with nanostructures suitable for increasing wettability followed by providing a coating on the surface, in which the coating itself inherently exhibits a low wettability (e.g. hydrophobic); the rate of wetting can be controlled based on opposing wettability characteristics (i.e. the coating having a low wettability (e.g. hydrophobic) and the nanostructured surface having a high wettability (e.g. hydrophilic)) as shown in Example 5.

For example, a nanostructure configuration on a surface can be configured to increase or decrease wettability of the surface and a coating can be selected based on wettability of the coating (e.g. of the coating being hydrophobic or hydrophilic). Selection of the surface configuration and the coating based on opposing wettability characteristics such that the coating has a lower wettability (e.g. hydrophobic), and can provide a means to control a rate of wetting of the coated, nanostructured surface.

For example, an $R_a$ (RMS) of typical glass surfaces as produced, are less than approximately 0.5 nm. Surfaces of the present disclosure comprising nanostructures can range from 1-400 nm which is microscopically rougher than typical glass surfaces while still appearing macroscopically, as a smooth surface, that is, appearing similar to a corresponding surface prior to nanostructure fabrication. In some embodiments, the surfaces of the present disclosure comprising nanostructures can be approximately 30 nm. Such surfaces are exemplified in Example 3. The term "wetting" as used herein refers to an ability of a liquid to maintain contact with a solid surface and can be related to a ratio of a surface area of a liquid droplet that is in contact with the solid surface to the total volume of the droplet, wherein the larger the contacted surface area to total volume, the greater the wetting.

According to another embodiment, a method for fabricating a surface configured to control fluidic properties of a liquid droplet is described. The method comprises determining a desired contact angle of the liquid droplet with the surface. Given a particular liquid and a surface comprising a particular material which inherently has a large contact angle, providing a surface with nanostructures can increase the contact angle. Given a particular liquid and a surface comprising a particular material which inherently has a small contact angle, providing the surface with nanostructures can decrease the contact angle. Thus a surface having a high wettability (e.g. a hydrophilic surface) can exhibit increased wettability (e.g. a superhydrophilic surface) and a surface having a low wettability (e.g. a hydrophobic surface) can exhibit decreased wettability (e.g. superhydrophobic) by providing the surface with nanostructures.

Based on a desired increase or decrease in contact angle, an average height, inclination and distance between the nanostructures can be selected. In some embodiments, in order to optimize a surface for a particular desired result, the etching conditions and nanoparticle mask type can be varied and the resulting surfaces can be tested for the desired result. Nanoparticle mask type can be varied, for example, to select a mask type with either a faster or slower rate of etching depending on whether a larger or smaller etch rate selectivity (with respect to the surface to be etched) is desired.

Etching conditions which can be varied include, but are not limited to a type of etchant (e.g. $Cl_2$, HCl, $BBr_3$, etc.), a type of etchant (e.g. wet, plasma, gas, etc.) a concentration of the etchant, temperature at which etching takes place, and an amount of time of contacting the etchant with the surface to be etched.

For example, a wet etchant such as aqueous acid (e.g. HCl, HBr, $HNO_3$, $H_2SO_4$, etc.) can lead to an isotropic etch, thus providing a cone-like nanostructure. As another example, a plasma etch can give highly anisotropic/vertical corresponding to nanostructures like structures with a low or 0° inclination angle of nanostructures as exemplified in Example 1. By changing the gas chemistry, a plasma etch can be made more or less isotropic, thereby changing the inclination angle. In some embodiments, height can be controlled by the etching time. For example, a longer etching time can lead to taller nanostructures as this allows for a deeper etching and shorter etching times can lead to shorter nanostructures as the etchant is exposed to the surface for a shorter period of time and thus does not etch as deep into the surface compared to longer etching times for a give surface and etchant.

In some embodiments, isotropic etching can be used for fabricating nanostructures on a surface. Isotropic etching can be achieved by etching a surface with a liquid etchant. Etching with a liquid to give isotropic etching can lead to nanostructures having a curvature or arc along their inclination. For example, a nanostructure resulting from an isotropic etching can have a substantially cone-shaped structure, wherein inclined surfaces of the substantially cone-shaped structure are concave or convex surfaces (e.g. cuspidal shape), or can have a substantially pillar-shaped structure, wherein the walls of the pillar-shaped structure are concave or convex surfaces.

In some embodiments, anisotropic etching can be used for fabricating nanostructures on a surface. Anisotropic etching can be achieved by etching a surface which is amenable to anisotropic etching, with an anisotropic etchant including, but not limited to KOH (or other alkali metal hydroxides), EDP (ethylenediamine pyrochatechol), TMAH (tetramethylammonium hydroxide). Etching with a liquid to give anisotropic etching can lead to nanostructures having near-linear inclination angle. For example, a nanostructure resulting from an anisotropic etching can have a substantially cone-shaped structure or a substantially pillar-shaped structure.

To control distance between nanostructures, size of a corresponding nanoparticle can be varied. Further, a tendency of nanoparticles to agglomerate in solution and concentration of the nanoparticles in a solution will affect distance between nanostructures. For example, a higher concentration of nanoparticles can result in a greater number of particles being dispersed onto a surface and therefore result in a shorter distance between the structures while a lower concentration of nanoparticles should result in fewer particles being dispersed onto the surface, and therefore a greater distance between the structures.

In some embodiments, the method according for fabricating the plurality of nanostructures comprises spin-coating nanoparticles on the surface to be used as an etching mask and etching the surface to provide nanosized structures followed by a removal of the nanoparticles by rinsing the surface with a solvent. Solvents include water as well as organic solvents, including but not limited to acetone, diethyl ether, methyl t-butyl ether, acetonitrile, benzene, toluene, hexane, pentane, methanol, ethanol, isopropanol, t-butanol, nitromethane, and tetrahydrofuran.

In some embodiments, nanoparticles are spray coated onto a surface. In some embodiments nanoparticles are introduced onto the surface by a nanoparticle ink such as the method described in reference [24], which is fully incorporated by reference herein.

For example, in reference [24], a silica nanoparticle ink is prepared by mixing nanoparticles with poly-4-vinylphenol in ethanol. Concentrations of nanoparticles and PVPh can be approximately 50 g/L and 0.2% by weight, respectively but are not limited to these values and can be varied to provide more or less nanoparticles on a surface. A coating assembly in [24] comprises a wire-wound rod, which is a stainless steel rod with stainless steel wire wound around it. The nanoparticle ink can be dropped onto a substrate and the rod pulled across, leaving behind a volume of solution equal to the groove space between each wire winding and ultimately leading to a uniform film comprising a nanoparticle. The diameter of the wire on the rod can be used to control a thickness of a wet film.

Nanoparticles to be used as an etching mask are selected such that an etch rate of the nanoparticle is less than an etch rate of the substrate given particular etching conditions. Further, the size of the nanoparticles is selected based on a desired height, inclination angle, and distance between the nanostructures. This method is exemplified in Example 1.

The term "nanoparticle" as used herein refers to a particle with at least one dimension being approximately between 1-1000 nm. A nanoparticle can comprise any atoms, molecules, complexes, or mixtures thereof having as a whole particle at least one dimension (height, width, diameter) being approximately between 1-1000 nm. Examples of nanoparticles include, but are not limited to, aluminum oxide nanoparticles, silica nanoparticles, metal nanoparticles, ceramic, and oxide nanoparticles. Additionally, micron sized particles can be used to achieve the same effects but at a larger length scale. This can be desirable in applications where a desired length scale for the application is larger than nanoscale (e.g. microscale). For example, such application can be when wettability is desired but transparency is not considered. For example, once a particular surface material is selected for which a nanotextured surface is desired, a particle can be selected based on its ability to etch differently from the surface substrate. In particular, the etch rate of a particle should be different from the etch rate of the surface substrate given a particular etchant and etching conditions, although the etch rate particle does not have to be lower than the etch rate of the surface substrate.

In some embodiments, the etch rate selectivity between a particle and a substrate is greater than 10. Thus, a particle can be selected for a particular surface by selecting a particle which has an etch rate selectivity with the substrate which is greater than approximately 10.

While an etch rate selectivity of approximately 10 can provide a large enough difference in etch rate to provide a nanotextured surface according to method herein described, larger or smaller etch rate selectivities can be used without departing from the scope of the present disclosure. For example, the greater the selectivity ratio, the closer in diameter the particle can be to your target nanostructure size. However, if the etch rate selectivity is small, a nanoparticle which is larger than a desired nanostructure size can be used as it will etch to some extent during the etching process and become smaller, thus leading to a smaller nanostructure size.

For example, if borofloat glass is selected as a surface for which a nanotextured surface is desired, a fused silica nanoparticle can be selected. The fused silica nanoparticle can etch slower than the borofloat in a fluorine plasma thus providing a system according to the present disclosure suitable for providing nanotextured surfaces, but as the difference between these etch rates is less than would be observed with an alumina particle, thus giving a lower etch rage selectivity, the starting diameter of the particle will be larger than the a target nanostructure size.

For example, an etch rate selectivity of Borofloat to fused silica particle etch rate is expected to be less than an etch rate selectivity of Borofloat etch rate to alumina particle as there is a smaller difference in etch rate between Borofloat and fused silica than there is between the Borofloat glass and the alumina. Thus, because a nanoparticle will erode over time under the etching conditions, you would need a bigger fused silica particle for the same final feature size as compared to an alumina given the etch rate selectivities of approximately 10 and 2, respectively.

Thus, as long as there some difference in etching rate between a surface substrate and a nanoparticle, then a nanotextured surface can be provided by using different etch rate selectivity, control over the final structure of the nanotextured surface can be achieved.

Figure 2:
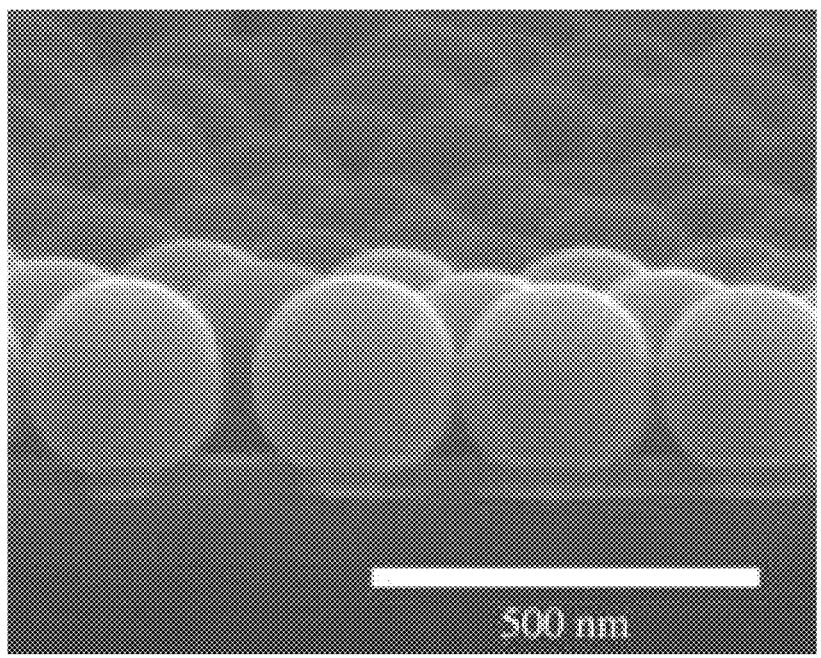
FIG. 2 shows pictures illustrating a nano-patterning of a rigid structure with a nanoparticle based etch mask according to embodiments herein described.
Figure 2:
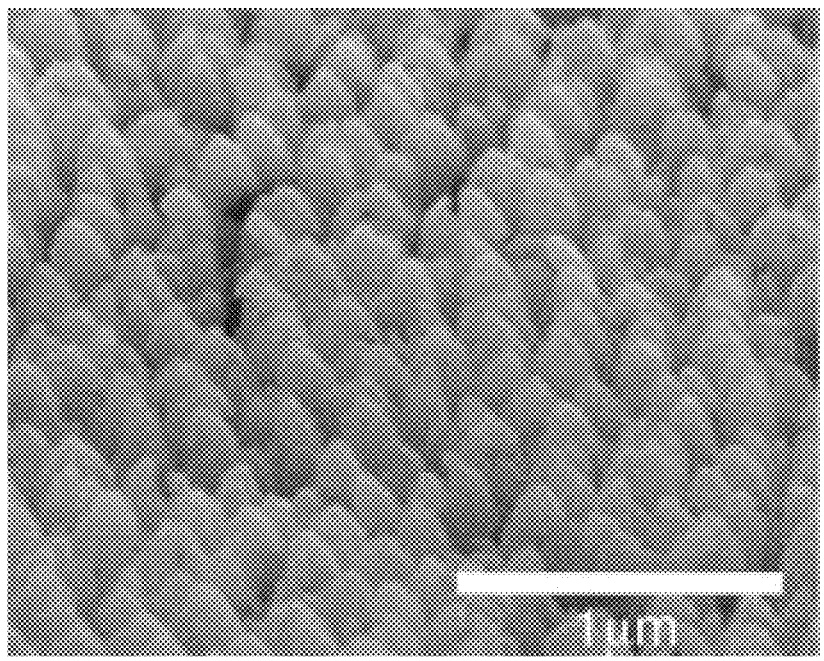

Further methods for etching with nanoparticle masks can be found in reference [10], a result of which is shown in FIG. 2.

The method according to the present disclosure can be applied to any surface material for which there is a corresponding nanoparticle that etches differently from the surface material under particular etching conditions.

For example if a surface comprises sapphire, silica nanoparticles can be used. This is because sapphire can etch well in chlorine, for example, with $HClCl_2$, and/or $BCl_3$, however, silica does not etch well in chlorine. The ability of sapphire to etch in chlorine and silica to be resistant to etching in chlorine is further exemplified by corresponding etching rates as the etching rate for sapphire in chlorine is higher than that the etching rate of silica in chlorine.

As another example, if a surface comprises a glass, aluminum oxide nanoparticles can be used. This is because glass can etch well in fluorine, for example, $F_2$, HF, $XeF_2$, and fluorocarbon gases such as $CF_4$, and $C_2F_6$, etc., however, aluminum oxide does not etch well in fluorine. The ability of glass to etch in fluorine and aluminum oxide to be resistant to etching in fluorine is further exemplified by corresponding etching rates as the etching rate for glass in fluorine is higher than that the etching rate of aluminum oxide in fluorine. It should be noted that etch rates can be increased or decreased with increasing or decreasing etchant concentration.

As a further example, if a surface comprising a fluoride-based optic is selected metal nanoparticles can be used. A fluoride-based optic can include an optic based on fluoride salts, for example, $LiF$, $CaF_2$, $MgF_2$, $YF_3$, or $AlF_3$, but is not limited to these examples. Metal nanoparticles can include, but are not limited to platinum, palladium, gold, metals having low sputter rates, and noble metal-based nanoparticles. Metal nanoparticles can serve as an etching mask for fluoride-based optics because fluoride-based optics can etch well by argon sputtering. Using argon sputtering, the metal would likely erode more slowly than the fluoride. Metals having low sputter rates (e.g. from approximately 0.2-1.2 nm/min) can include but are not limited to gold, silver, cobalt, chromium, copper, iron, molybdenum, nickel, palladium, platinum, tantalum, tungsten.

As another example, if a surface material comprising a metal is selected, oxide nanoparticles such as silicon oxide can be used. This is because metal substrates can etch well in chlorine wet etchants such as HCl, however, oxides do not etch well in chlorine wet etchants. The ability of metal substrates to etch and oxides to be resistant to etching in chlorine wet etchants is further exemplified by corresponding etching rates wherein etch rates of metals in chlorine is fast and etch rate of oxides in chlorine is slow.

In some embodiments, the etching can be a plasma etch, however, wet chemical can be used as well. Plasma etchants can include, but is not limited to $Cl_2$, $CCl_4$, $SiCl_4$, $BCl_3$, $CCl_2F_2$, $SF_6$, and $NF_3$. Wet etchants include but are not limited to HCl, HBr, mineral acids, ceric ammonium nitrate mixtures, citric acid/$H_2O_2$, aqua regia, piranha, and HF/$HNO_3$. Various etchants, wet and/or plasma, and corresponding materials that are expected to etch slowly or quickly relative to another material and with reference to a surface and/or a nanoparticle, is identifiable by one skilled in the art.

In some embodiments, once a surface is fabricated according to methods of the present disclosure, efficacy of the surface in controlling fluidic properties of a liquid can be estimated by measuring contact angle and comparing to a desired contact angle.

Contact angle measurements can be performed by taking photographs of a droplet on surface with a high zoom camera and using suitable computer software to measure a contact angle between a solid sample's surface below the droplet and the tangent of the droplet's ovate shape at the edge of the droplet.

Thus, if a measured contacted angle is higher or lower than a desired contact angle, the dimensions and distance between the nanostructures can be adjusted.

In some embodiments, wetting characteristics of a surface can be controlled by forming nanostructures on the surface where controlling of the wetting characteristics is desired. Such surface can be referred to as a nanostructured surface. The nanostructures can be a plurality of nanostructures that can be spaced apart at a distance that can be varied according to desired spacing during the manufacturing process.

In addition, the nanostructures can have further structural parameters that can be varied, such as width or diameter of the nanostructure, an inclination angle or curvature of the nanostructure, height of the nanostructure, roughness of the nanostructure walls, and bridging elements between the nanostructures. Specific definitions for each of the structural parameters will be described in later paragraphs.

In some embodiments, the nanostructured surface can comprise three wetting characteristics. According to a first wetting characteristic, when the fluid comes in contact with the nanostructured surface, the fluid forms into a droplet formation and substantially avoids being lodged within the nanostructured space. With the fluid not being lodged within the space, the fluid can be expulsed or evaporated from the nanostructured space. Such first wetting characteristic can be desired, for example, for antifogging lenses such that droplets bead and run off of the lens surface before a light scattering fog can form. According to a second wetting characteristic, when the fluid comes in contact with the nanostructured surface, the fluid becomes lodged within the nanostructured space and the fluid can be expulsed or evaporated from the nanostructured space. Such second wetting characteristic can be desired, for example, for antifogging lenses such that water wets the surface, thus substantially avoiding the formation of a fog of light scattering water droplets. According to a third wetting characteristic, when the fluid comes in contact with the nanostructured space, the fluid initially becomes lodged within the nanostructured space, and the fluid can be expulsed or evaporated from the nanostructured space. The lodging in the third wetting characteristic occurs at a slower rate than a rate of the second wetting characteristic. Thus, the wettability of a surface having the third wetting characteristic is high and the resistance to wetting is also high. By way of example and not of limitation, the first wetting characteristic generally refers to contact angles between approximately 90-180°, the second wetting characteristic generally refers to contact angles between approximately 0-60° that is achieved faster than the third wetting characteristic, and the third contact angle generally refers to contact angles between approximately 0-60° that is achieved slower than the second wetting characteristic. The extreme limits of high and low wettability is, respectively, a 0° contact angle of a fluid with a surface (i.e. perfect wetting) and no droplets being formed on the surface at all.

The structural parameters that can be varied to control a wettability of a nanostructured surface includes one or more of nanostructure width, nanostructure inclination angle or curvature, nanostructure height, distance between nanostructures, and roughness of nanostructure walls.

The structural parameters that can be varied to control wettability of a nanostructured surface can also be used in connection with other characteristics of the nanostructured surface, including but not limited to a desired mechanical strength/durability/wear resistance, a desired optical transparency with respect to a particular wavelength/frequency of light or range of wavelengths/frequencies of light, and an ability to fabricate the structures given a particular material and/or fabrication method.

In some embodiments, the wetting characteristics can be varied by controlling various environmental parameters such as, for example, an atmosphere in which the fluid is surrounded in, a temperature of the atmosphere, or an identity and composition of one or more gases in the atmosphere. The wettability can also be controlled by controlling the temperature of the substrate that is to be wetted. A wetting characteristic of a surface with a liquid can be dependent on whether a droplet prefers the interface of the atmosphere or an interface of the nanostructured surface. Such preference is a function of the surface free energy between the fluid and the one or more gases in the atmosphere in comparison to the surface free energy between the fluid and surface. By way of example and not of limitation, if the atmosphere is ambient air generally found on earth, the identity can be a composition of nitrogen, oxygen and argon. Such environmental parameters can be associated to surface free energy between the fluid and the one or more gases in the atmosphere, or the surface free energy between the fluid and the nanostructured surface. Consequently, by controlling the environmental parameters, the surface free energy can vary as a function of such environmental parameters and thus affect the wettability of the nanostructured surface, e.g., the first, second or third wetting characteristics.

Other factors than can affect wettability of a surface with respect to a particular liquid is viscosity of the liquid, surface free energy of the liquid, surface tension of the liquid, and temperature of the surface and/or the atmosphere. For example, for a more viscous liquid, there is inherently a greater resistance to rolling down a surface, thus such liquids can be less sensitive to the inclination angle.

Figure 16B:
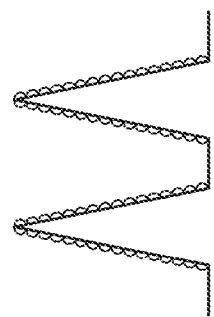
FIG. 16B shows a substantially cone shaped nanostructure having wall roughness.
Figure 16C:
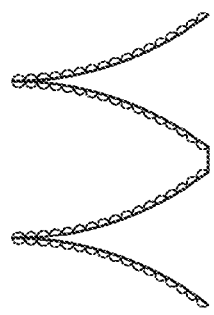
FIG. 16C shows a pointed.

By way of example and not of limitation, according to one exemplary configuration of a high wettability nanostructured surface, the nanostructures can comprise a plurality of substantially cone-shaped nanostructures having minimal roughness. The base width of the nanostructures can be approximately 30 nm and the height can be approximately 70 nm. In such configuration, the resistance of the nanostructured surface can be low, such that the rate of wettability is fast. In some embodiments a substrate can comprise substantially cone-shaped nanostructures having high wettability, and the walls of the nanostructures can be roughened by coating the walls with a low wettability coating as shown in FIG. 16B. In such configuration, by way of example and not of limitation, the base width of the nanostructures can be approximately 1 micron and the height can be approximately 20 microns, and the resistance of the nanostructured surface can thus be high due to the wall roughening can slow the rate of wettability.

In some embodiments, a method for fabricating a surface configured to control fluidic properties of fluids is described. The method comprises providing a master template, the master template comprising a plurality of nanostructures. The nanostructures can have an average height ($h_{avg}$) and an average inclination angle ($i_{avg}$) and be located at a distance one with respect to another to define an average distance ($d_{avg}$) between the nanostructures and the height ($h_{avg}$), inclination ($i_{avg}$), average distance ($d_{avg}$), and material (M) of the nanostructures are a function (f) of a desired contact angle or desired range of contact angles (ca) of the liquid droplet, according to a formula ca=$f(h_{avg}, i_{avg}, d_{avg}, M)$. In the method, the master template is harder than the substrate to which the pattern is transferred and the transferring of the pattern is performed using hot embossing.

The term "master template" as used herein refers to a template comprising a pattern from which the pattern can be transferred individually to a plurality of receiving surfaces.

The term "embossing" as used herein refers to a technique of imprinting structures on a substrate using a master template. Embossing can be an inexpensive technique and can be used to transfer a pattern from a hard master template to a softer, often polymer-based substrate.

In some embodiments, an etched surface can serve a template which can be used to transfer a pattern from the etched surface onto a softer material. In particular, embossing can be used to transfer a pattern from an etched surface onto a material which is softer than the etched surface. Thus, by pattern transfer using embossing techniques known in the art, a pattern opposite of that obtained with etching can be obtained.

Embossing, performed by transfer from a template to a material which is softer than the template can be performed without heating the material to which the pattern is transferred if the material is soft enough at room temperature, however, heating can be used to soften the material to which the pattern is transferred if it is not soft enough at room temperature.

The embossing method has been extended to transfer complex patterns from and to many different materials at nanometer length scales [12]-[18]. Pattern transfer of super high wettability (e.g. superhydrophilic) or super low wettability (e.g. superhydrophobic) nanostructure from a master template to a polymeric lens material is described herein using embossing techniques.

For example, surfaces according to the present disclosure configured to control fluidic properties of a liquid droplet comprising a plurality of nanostructures having an average height ($h_{avg}$) and an average inclination angle ($i_{avg}$) and being located at a distance one with respect to another thus defining an average distance ($d_{avg}$) between the nanostructures which are fabricated onto a hard master template can be transferred to a softer surface by hot embossing. Materials and Methods for pattern transfer by hot embossing as described in references [12]-[18] can be applied to the method of the present disclosure.

Hot embossing with a nanostructured master template in silicon using standard semiconductor processing techniques followed by a high-fidelity pattern transfer from the silicon substrate into representative lens materials such as polycarbonate and polyurethane using nano hot embossing.

This provides a surface configured to control fluidic properties of a liquid which is inherently part of a structure and therefore not subject to delamination or cracking due to mismatches in thermal expansion coefficients. A number of surfaces can imprinted from a single master template, for example, reference [15] describes over 300 embossing cycles without failure of pattern transfer.

Materials which can serve as a master template can include hard materials such as silicon-based semiconductors and materials as described in references [12]-[18].

A master template can be fabricating using a nanoparticle masking technique according to some embodiments herein described or can be fabricated using known lithography techniques.

Materials on which a pattern can be transferred, include but are not limited to, polycarbonates, polyurethanes, polyethylene terephthalate, polyacrylates, fluoropolymers and materials as described in references [12]-[18].

Thus, hot embossing provide a method for transferring a pattern suitable for controlling fluidic properties of a liquid onto a wide range of materials having a wide range of properties and applications. For example, fluoropolymers can survive temperatures ranging at least from −50 to +50° C.

Furthermore, surfaces according to the present disclosure can be coated by atomic layer deposition which can provide ultrathin, conformal, pinhole free, dense coatings that can be deposited over arbitrarily large surfaces areas with angstrom level precision [19]-[22].

ALD coatings have been utilized in a number of different coating applications, including wear resistance, optical coatings, and wettability (e.g. superhydrophilic/superhydrophobic) treatments. These characteristics of ALD make it well suited to produce multifunctional surface treatments. The uniformity of the ALD technique allows coatings to be applied to large batches of substrates at the same time.

Therefore, once surface according to the present disclosure is fabricated, an ultra-thin, conformal ALD coating can be used to provide additional wear resistance and/or to reduce glare, etc. without sacrificing transparency.

Desired dimensions of nanostructures to achieve control of wettability for a nanostructured surface can be selected based on any one or more of: mechanical strength, ease of fabrication, transparency, and robustness. For example, if stronger material is used for fabricating a nanostructured surface then a wider range of height and base width can be used and/or if transparency of the nanostructured surface is not desired then larger range of dimensions can used In some embodiments of the disclosure, it is desired that the surface configured to control fluidic properties of a liquid droplet is transparent. In particular, in some embodiments, if a surface is transparent, it is desired that transparency is maintained after fabrication of nanostructures into the surface. For example, if a surface configuration to be controlled is that of optical components such as goggles, lenses, windows, and windshields, maintaining transparency of the optical components can be important.

The term "transparency" as used herein refers to a physical property of allowing a passage of light through a material. In particular, the passage of light through the material occurs without scattering the light.

In some embodiments, distances between nanostructures are based on a desired transmission of light of a particular wavelength/frequency or light of a particular range of wavelengths/frequencies through the surface. If the nanostructures are larger or equal to in size compared to the wavelength of light for which transmission is desired, the light will begin to scatter. If the structures are smaller in size compared to the wavelength for which transmission is desired, scattering of light can be avoided and thus provides a surface with high clarity, as exemplified in Example 4.

For example, if a passage of visible light is desired, which starts at approximately 400 nm (i.e. roughly 10 fold larger wavelength), the surface can be transparent if the characteristic dimensions of the nanostructures are 400 nm or less. An exemplary range to avoid light scattering is 10-fold smaller than the smallest wavelength for which transmission of light is desired, for example dimensions of 40.

In a consideration of light transmission in a nanostructured surface, both feature of distance and width are considered in connection with a desired size of the nanostructure to avoid light scattering. For example, both features being less than the wavelength for which transmission of light is desired can avoid light scattering.

The distance between nanostructures and the width of the nanostructures can be configured to maintain transparency of a surface for a given range of wavelengths of light. For example, a ratio of approximately 10:1 of wavelength to feature size can provide a higher transparency. However, a smaller ratio can be used with a small loss in transparency.

Thus, increasing a feature size with respect to a given wavelength of light can decrease transparency of surface with respect to the wavelength of light, while decreasing a feature size with respect to a given wavelength of light can increase transparency of surface with respect to the wavelength of light.

Depending on wavelength of light for which passage of the light through a surface is desired, a target feature size can vary. For example, if passage of ultraviolet (UV) light though a surface is desired, given that UV light ranges from 10-400 nm, much smaller feature sizes can be used on a surface for which passage of UV light is desired than for a surface through which passage of visible light is desired given that visible light ranges from 400-750 nm. Thus, the smaller the wavelength of light for which passage of the light through a surface is desired, the smaller the feature size can be. However, depending desired criteria for transparency, dimensions of nanostructures having a size equal to a lowest wavelength of a selected range of wavelengths can provide the nanostructured surface with approximately 10% loss of transparency.

While transparency of light of a certain wavelength can be a consideration for some applications, if a surface for which control of fluidic properties of a liquid is desired is for a non-transparent surface, this consideration may not be necessary. For example, if the control of fluidic properties is desired to achieve anti-fouling properties on a boat hull, then the size and periodicity of the nanostructures can be selected based on a desired contact angle and passage of light does not need to be considered.

In some embodiments, height of a nanostructure can be selected based on a wear rate. For example, nanostructures comprising surface on an optical lens is likely subject to less wear than nanostructures comprising surfaces on a boat hull or airplane. Accordingly, a larger nanostructure height can be used in applications where wear is expected. Thus, with a larger nanostructure height, the nanostructures can wear down to a larger extent than shorter nanostructures before the control of fluidic properties is affected.

In some embodiments, nanostructural features can be selected based on a fabrication method, materials used for fabrication, and/or the material the surface is comprised of. For example, depending on strength of material, height and/or width of the nanostructures can be a consideration. Taller nanostructures can be weaker, thus nanostructure height and/or width can be a consideration depending on the material used and in particular, on the strength of the material used. Distance between nanostructures and/or width of nanostructures can be a consideration with respect to fabrication of nanostructures. For example, if weaker substrate material is used as the surface to be nanostructured, a wider nanostructure dimension can be selected. Various combinations of height, distance, width, and type of material can be independently varied to control wetting characteristics of the nanostructured surface.

Figure 17:
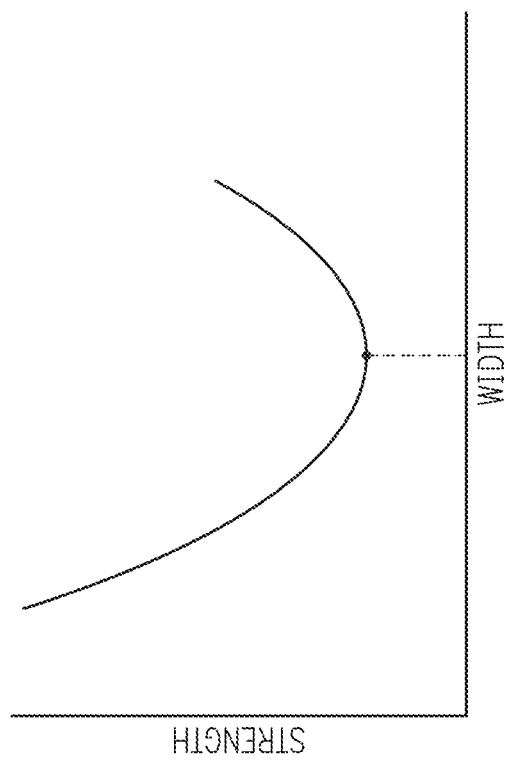
FIG. 17 shows a graph of durability versus width of an exemplary nanostructure made of gold and indicates that, the strength increases for nanostructures larger than approximately 1 micron, and the strength for nanostructures decreases for nanostructures smaller than approximately 1 micron.

While height, distance, width, and type of material can be varied, there can be other considerations, for example, as shown in FIG. 17. FIG. 17 shows a plot of an exemplary nanostructure made of gold showing durability versus width and shows that nanostructures below approximately 1 micron increase in durability with decreasing width, while nanostructures above approximately 1 micron show increasing durability with increasing width (see reference [25]). Although FIG. 17 shows a plot for gold, this plot is exemplary of other metals, for other metals the value of the minimum width can vary.

Figure 18:
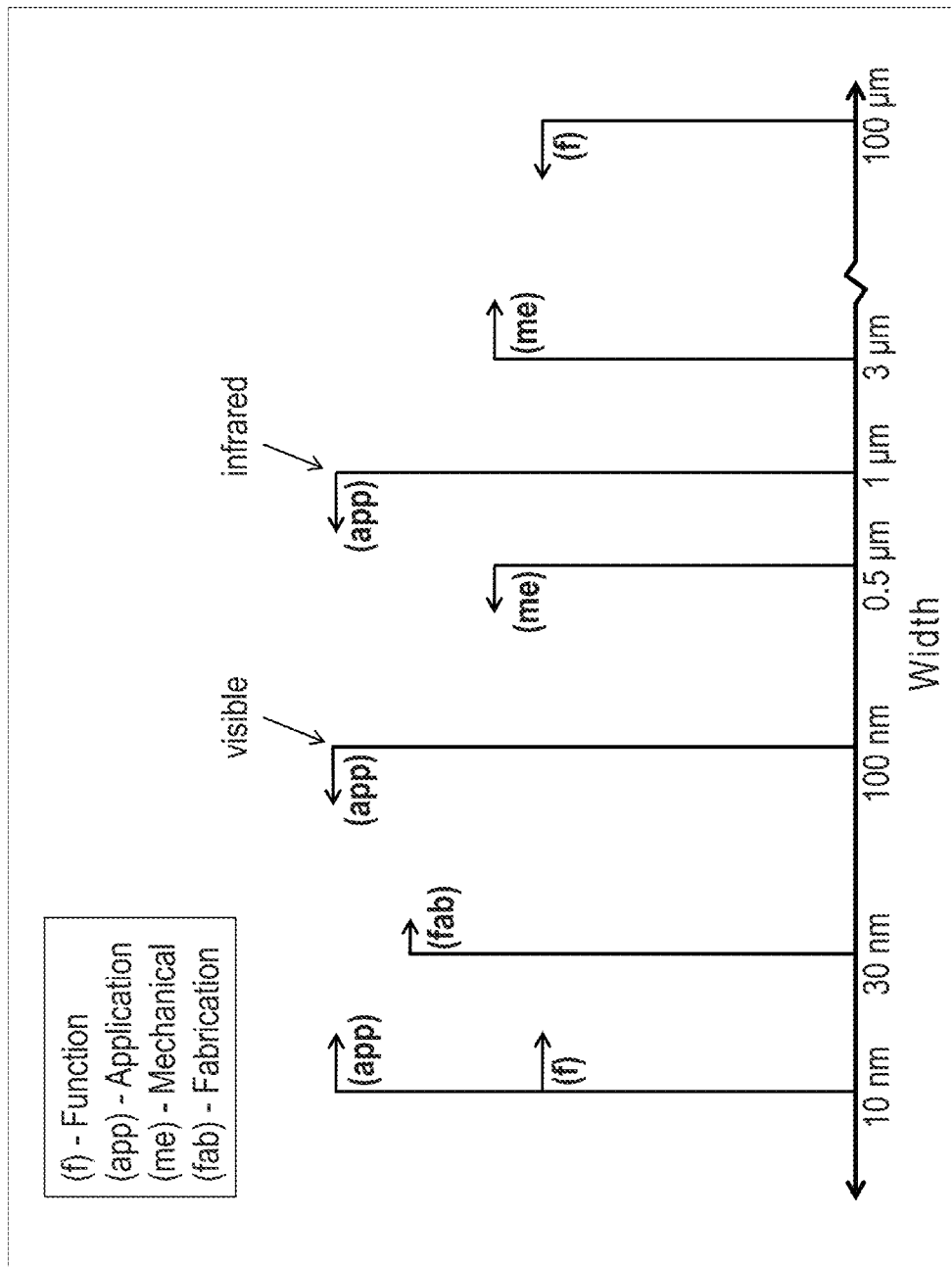
FIG. 18 shows an exemplary method of selecting a nanostructure configuration for an antifogging application glass with transparency, fabrication and mechanical considerations.
Figure 19A:
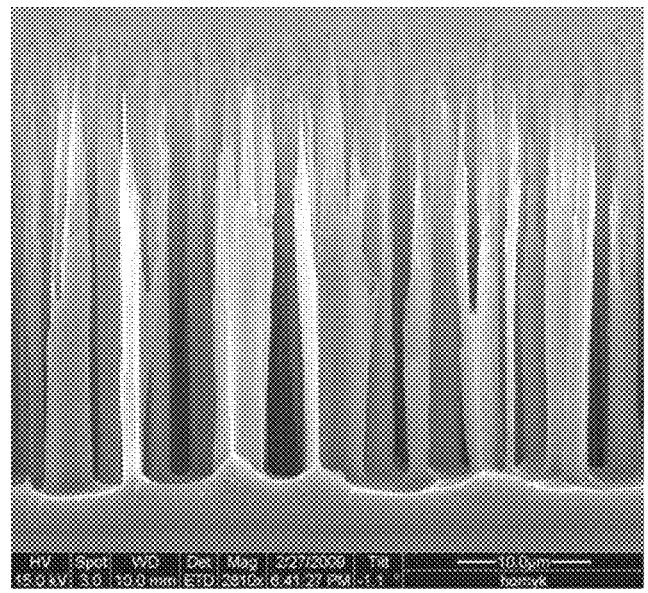
FIGS. 19A-19B show exemplary SEM images of nanostructures.
Figure 19B:
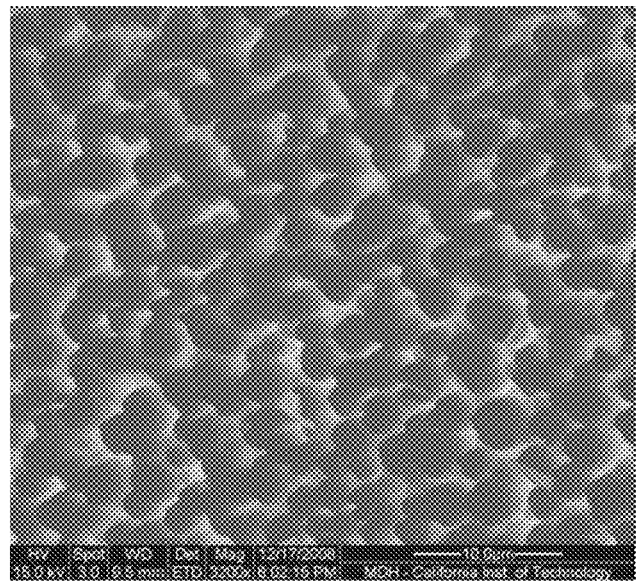

FIG. 18 shows an exemplary method of selecting a nanostructure configuration for an antifogging application glass with transparency, fabrication and mechanical considerations. By way of example and not of limitation, the width of the nanostructures can be selected between 10 nm and 1 micron in order for the surface to function as an antifogging surface. The width of the nanostructure can also be selected based on an ability to fabricate such nanostructures. The width of the nanostructures can also be selected based on a desired durability of the nanostructures as shown in FIG. 17. Additionally, in order to maintain transparency of such glass surface, the width can be selected based on a desired transparency of a wavelength range, in particular, a width that is less than a lowest wavelength of the wavelength range.

In some embodiments, the surfaces for which control of fluidic properties of a liquid is desired are robust. Nanostructures which can provide the control of fluidic properties of a liquid are inherently part of the surface. As such, they can be more robust than a coating, as coatings can be subject to delamination or cracking due to mismatches in thermal expansion coefficients, mechanical abrasion, etc.

For example, a surface according to the present disclosure can maintain control of fluidic properties after exposure to chemical and thermal extremes. Chemical extremes can include exposure of a surface to various solvents including, but not limited to acetone, methanol, isopropanol, water, ethanol, hydrocarbon solvents, and others. Thermal extremes include exposure to high and/or low temperatures. Robustness of surfaces of the present disclosure is exemplified in Example 5.

In some embodiments, it can be desired to maximize wetting of a surface, for example, for a heat exchanger. In a heat exchanger, a surface having higher wettability can increase the rate of heat transfer by improving thermal conduction of the fluid. To the contrary, if the surface has lower wettability, then the rate of heat transfer can decrease as a consequence of reduced thermal conduction of the fluid with the surface. In other words, if thermal conduction is reduced, heat transfer will rely on less efficient heat transfer methods such as convection or radiation. Thus, a surface having higher wettability can improve thermal conduction, thereby increasing the efficiency of heat transfer. Similarly, a lower wettability on the surface of steam turbines can minimize corrosion of the turbine. According to another example, higher wettability in hydroelectric turbines can improve efficiency by improving the flow of water through the turbine blades.

In some embodiments, the surface of windshields, eye goggles, eyeglasses, minors and other lenses can have nanostructured surfaces. For example, it may be desirable that such surfaces do not fog up when fluids such as, for example, water vapor come in contact with the nanostructured surfaces. Such anti-fogging surfaces can be obtainable by forming nanostructured surfaces to obtain the lower wettability configuration as described in the present disclosure. Similarly, the lower wettability configurations can be formed on boat hulls and aircrafts by forming nanostructured surfaces on the surfaces of the boat hull and aircraft for anti-fouling or anti-corrosion, respectively.

In some embodiments, a nanostructured surface can be used to separate mixtures of liquids such as an emulsion, a solution, or a two-phase system. For example, a separation of liquids using a nanostructured surface can be performed on a mixture of liquids, wherein the liquids to be separated have different resistances with respect to a nanostructured surface. Liquids to be separated can further comprise a solute that can be separated concomitantly with a first liquid from a second liquid in a mixture of liquids.

In some embodiments, copper nanopillars or nanopipes can serves as nanostructures as exemplified in Example 9. A method for controlling wettability of a surface can comprise providing the surface with copper nanopillars or nanopipes, fabricated in a configuration suitable for controlling wettability. Further, the inside of the copper nanopipes can be used as a second surface on which wettability is controlled. For example, outside of a copper pipe can have a first surface configured to control wettability and the inside of a copper nanopipe can have a second surface configured to control wettability of a fluid. The inside and outside of the copper pipes can have similar wettability characteristics or different wettability characteristics. Additionally, the copper nanopipes can be used to route liquid. Thus, in some embodiments, the outsides of the copper nanopipes can serve as nanostructures for controlling wettability of a fluid and the copper nanopipes can be configured in such way that the fluid is expelled from the surface of the nanopipes and directed to the inside of the nanopipes for routing. Thus copper pipes can provide three dimensional structures to control a three dimensional wettability.

In some embodiments, a mixture of liquids to be separated can separated by providing a surface comprising copper nanopipes, the outside of which controls wettability of different fluids to different degrees, thereby directing a first fluid in a mixture of fluids into the nanopipes for routing while the other fluids remain, thus separating the first fluid from the mixture of fluids.

Thus copper nanopipes can be used in connection with providing controlling a wettability of a fluid and/or controlling fluidic properties of a fluid as well as other applications such as hollow copper antenna arrays, nanofluidic cooling piping for complex, compact supercomputers.

EXAMPLES

The surfaces, methods and systems producing according to embodiments herein described are further illustrated in the following examples, which are provided by way of illustration and are not intended to be limiting.

In particular, the following examples illustrate exemplary nanotextured surfaces and related methods and systems. More particularly the following examples illustrated production of nanotextured surfaces by nanoparticle masking and production of nanotextured surfaces by hot embossing techniques summarized herein below.

Nanotextured Surfaces by Nanoparticle Masking according to this approach that by selection of a suitable nanoparticle diameter and composition, as well as of plasma etching chemistry and input parameters, the disclosed method can be readily adapted to produce nanometer scale surface textures in a wide range of materials. To produce an inherently anti-fogging glass substrate, Applicants' adapted a nanoparticle based plasma etching process by appropriate modifications to the plasma chemistry and nanoparticle selection from reference 10. Applicants show that by careful selection of nanoparticle diameter and composition, as well as of plasma etching chemistry and input parameters, this technique can be readily adapted to produce nanometer scale surface textures in glass.

Nanotextured Surfaces by Pattern Transfer Using Nano Hot Embossing this approach allows fabrication of a durable inherently super high wettability (e.g. superhydrophilic) nanostructured master template in silicon using standard semiconductor processing techniques followed by a high-fidelity pattern transfer from the silicon substrate into representative lens materials such as polycarbonate and polyurethane using nano hot embossing. This approach, compared to certain super high wettability (e.g. superhydrophilic coatings), allows the high wettability (e.g. hydrophilicity) of the surface to be inherently part of the lens itself, and therefore not subject to delamination or cracking due to mismatches in thermal expansion coefficients. The fabrication sequence can be simpler and can result in a more reproducible result from lens to lens because hundreds of lenses can be made from a single nanostructured silicon master. Thus, unlike a nanostructured coating, each lens fabrication does not require a separate coating synthesis and application.

A person skilled in the art will appreciate the applicability and the necessary modifications to adapt the features described in detail in the present section, to additional surfaces, methods and systems according to embodiments of the present disclosure, A person skilled in the art will appreciate the applicability of the features described in detail for methods.

Example 1

Production of an Inherently Anti-Fogging Glass Substrate

To produce an inherently anti-fogging glass substrate, Applicants chose a fluorine-based plasma due to its ability to etch the $SiO_2$-based glass substrates and aluminum oxide ($Al_2O_3$) nanoparticles to serve as a shadow masking agent in the patterning step because alumina is resistant to fluorine attack.

In this example, aqueous dispersions (20% by weight) of α-aluminium oxide nanoparticles were obtained from US Research Nanomaterials, Inc (Tx). The average nanoparticle size measured prior to formation of the dispersion was 30 nm. The nanoparticle dispersion was diluted 1:4 with DI water prior to use. 100 mm diameter, 1.1 mm thick Borofloat glass wafers were obtained from Precision Glass & Optics (Santa Ana, Calif.). As-received glass wafers were prepared by rinsing in DI water and drying with nitrogen. The nanoparticle dispersion was applied to the glass wafers by pipette until the entire surface of the wafer was coated with the liquid. The water was then driven off by "spin-coating" at 2500 rpm for 30 seconds using a Solitec spinner. During the spin-coating step, the nanoparticles were deposited onto the glass. Applicants found that it was not necessary to apply a polystyrene adhesion layer to secure the nanoparticles to the glass in contrast to the process described in reference [11]).

After nanoparticle deposition the wafers were transferred to a PlasmaTherm PlasMaster etching system. A gas mixture of $CF_4/O_2$ (50 sccm/5 sccm) was used to etch those regions on the glass left unprotected by the alumina nanoparticle shadow masks. A plasma power of 40 W, pressure of 50 millitorr, and etch times of 15 and 40 minutes were used. After the plasma etches were completed, the nanoparticles were removed from the wafers by rinsing and sonicating in DI water.

As compared to certain type of coatings, this approach allows that wettability-controlling surface features are inherently part of the optical component material. Therefore, they are significantly less susceptible to delamination or cracking due to mismatches in thermal expansion coefficients, mechanical abrasion, etc., that commonly result in the degradation of coatings for a multitude of different applications. The fabrication sequence described here is simple and results in reproducible results because the spin-coating process in the patterning step does not require the precise location or distribution of the nanoparticles.

Example 2

Efficacy and Robustness of the Inherently Anti-Fogging Glass Substrate

The wetting characteristics of the as-received and etched surfaces were quantified by measuring the liquid-to-surface contact angle. Contact angle measurements were performed with a Navitar Ultra Zoom lens equipped with an IDS uEye LE—(5 mega pixel digital CMOS). Post capture measurements of the images were conducted using Nikon's AR Elements Software. A minimum of three replicates were done for each experiment. Applicants define the contact angle here as the angle between solid sample's surface below the droplet and the tangent of the droplet's ovate shape at the edge of the droplet ($\theta_C$, in FIG. 7). The contact angle is specific for any given system and is determined by the interactions across three mutually contacting interfaces (solid, liquid, and gas).

A higher contact angle corresponds to a lower solid surface energy, a lower chemical affinity, and a lower wettability, and vica versa. In contrast, a lower contact angle indicates a higher solid surface energy, a higher chemical affinity, and a higher wettability.

FIG. 1 shows a method of measuring water contact angle with a surface. The tube at top of the left image was used to apply the droplet to the wafer. In this example, the contact angle is small, indicating affinity for wettability due to high surface energy of the solid.

Figure 6A:
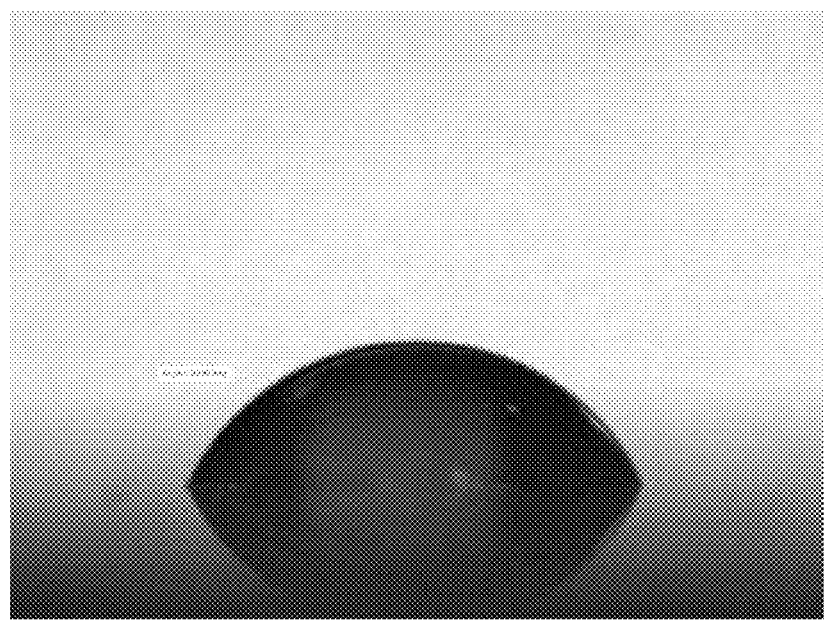
FIG. 6A shows an optical microscope image of a water droplet on unprocessed borosilicate glass. In this example, the contact angle of water droplet is 48°.
Figure 6B:
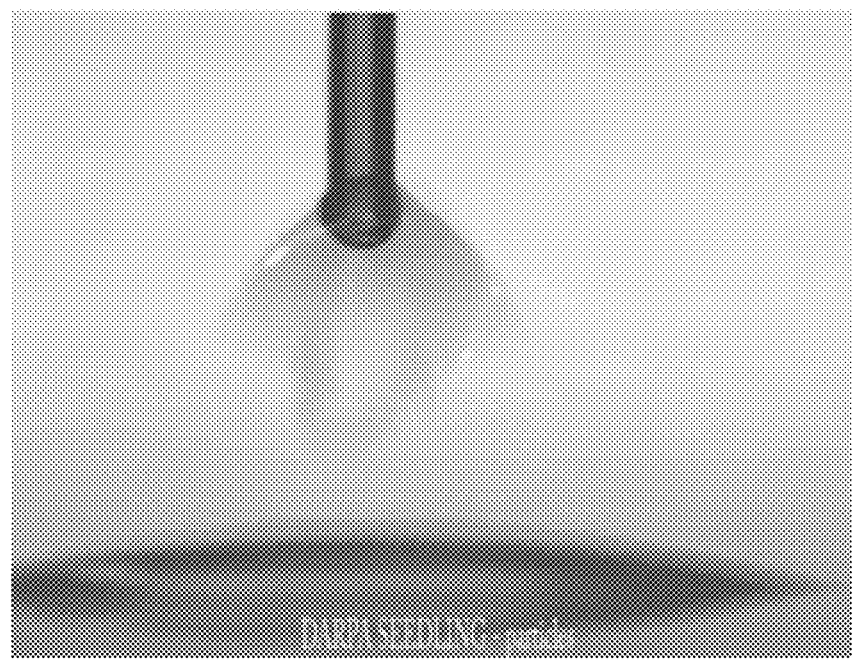
FIG. 6B shows a screen capture of high speed movie made using optical microscope of a water droplet coming into contact with nanotextured borosilicate glass. Contact angle in this example is effectively 0° as the droplet instantly wets the surface when it comes into contact with the glass.

The efficacy of the disclosed methods can be seen by contact angle measurements. Specifically, the as-received glass wafers had a water contact angle of 48°, while that of the processed wafers virtually vanished, as can be seen in FIG. 6. In fact, the spreading of the water droplets was so rapid on these nanotextured surfaces that it flattened immediately upon contact, nearly fully wetting the surface. A camera recording at 30 frames per second, was used to capture the incipient contact of the droplet with the nanotextured glass surface as the speed at which the droplets dispersed on the glass was too fast to capture with the naked eye.

The top of FIG. 6 shows an optical microscope image of a water droplet on unprocessed borosilicate glass and the contact angle of droplet is 48°. The bottom of FIG. 6 shows a screen capture of high speed movie made using optical microscope of a water droplet coming into contact with nanotextured borosilicate glass. In the bottom of FIG. 6, the contact angle is effectively 0° as the droplet instantly wets the surface when it comes into contact with the glass. The tube shown in the bottom of FIG. 6 was used to apply a droplet of 10 microliters in volume to from the wafer a distance of 3 mm.

Example 3

Morphology of the Nanotextured Glass Surface Characterized by AFM

Figure 4:
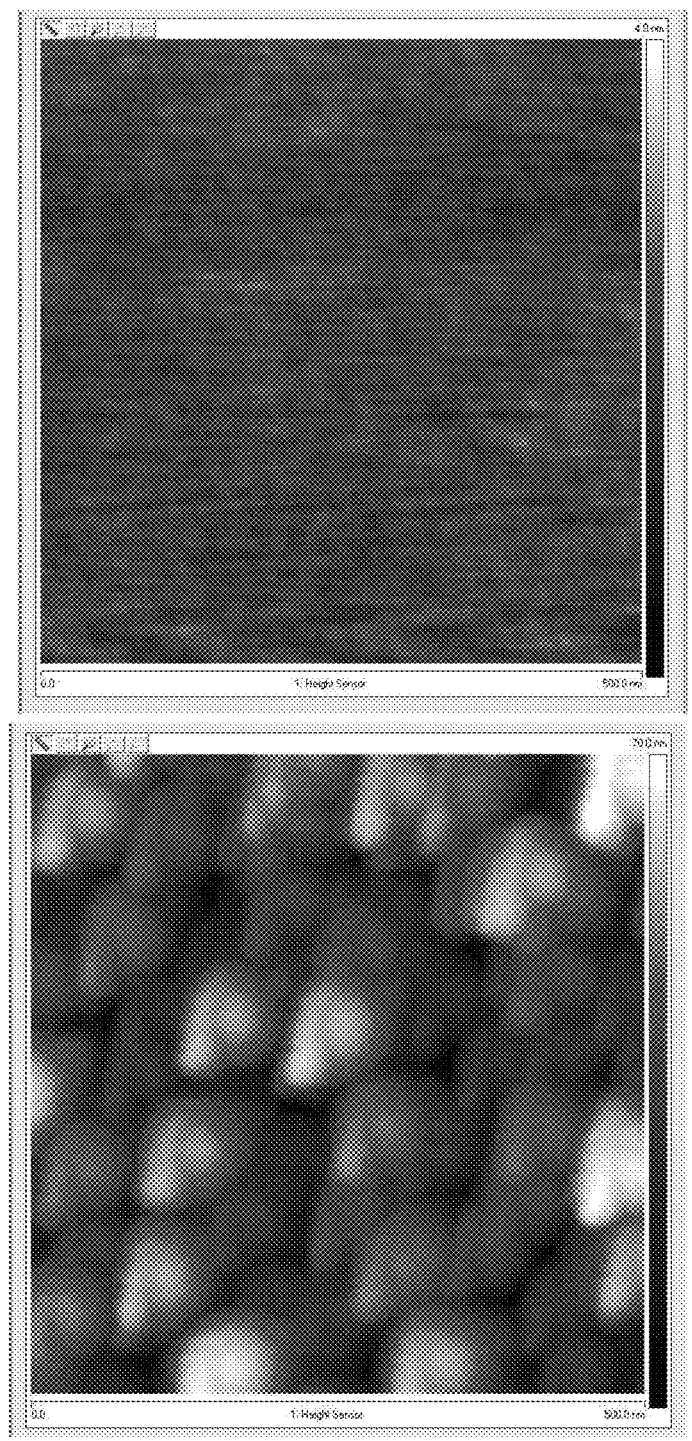
FIG. 4 shows electron microscope pictures illustrating surface roughness according to embodiments herein described. In particular FIG. 4 (top) shows atomic force microscope measurements of surface roughness of an as received borosilicate glass substrates having an Ra=0.19 nm and FIG. 4 (bottom) shows nanotextured borosilicate glass having an Ra=10.4 nm.

The morphology of the nanotextured glass surface was also characterized by atomic force microscopy (AFM) using a Digital Instruments Dimension DI3000 Atomic Force Microscope. FIG. 4 shows AFM scans of the distribution and magnitude of the roughness for the as-received (top of FIG. 4) and nanotextured glass wafers (bottom of FIG. 4). The initially smooth glass surface, whose root-mean-square roughness was 0.19 nm, is roughened to RMS of 10.4 nm. While the distribution of peaks and valleys on the surface is random, their characteristic diameter is close to the original 30 nm nanoparticle size. The AFM image bottom of FIG. 4 is representative of samples that were plasma etched for 15 minutes.

Example 4

Transparency of the Glass Wafers

Figure 5:
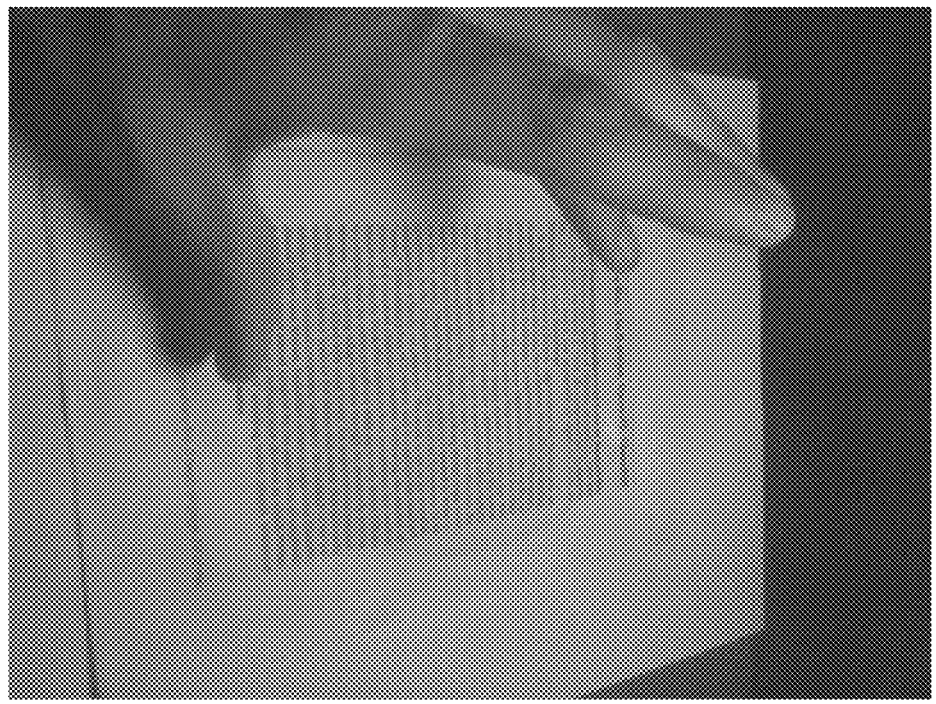
FIG. 5 shows pictures illustrating the clarity of the glass substrates described in FIG. 4. In particular, FIG. 5 (top) shows a picture illustrating the clarity of the as received borosilicate glass having a surface roughness of 0.19 nm, corresponding to FIG. 4 (top).
Figure 5:
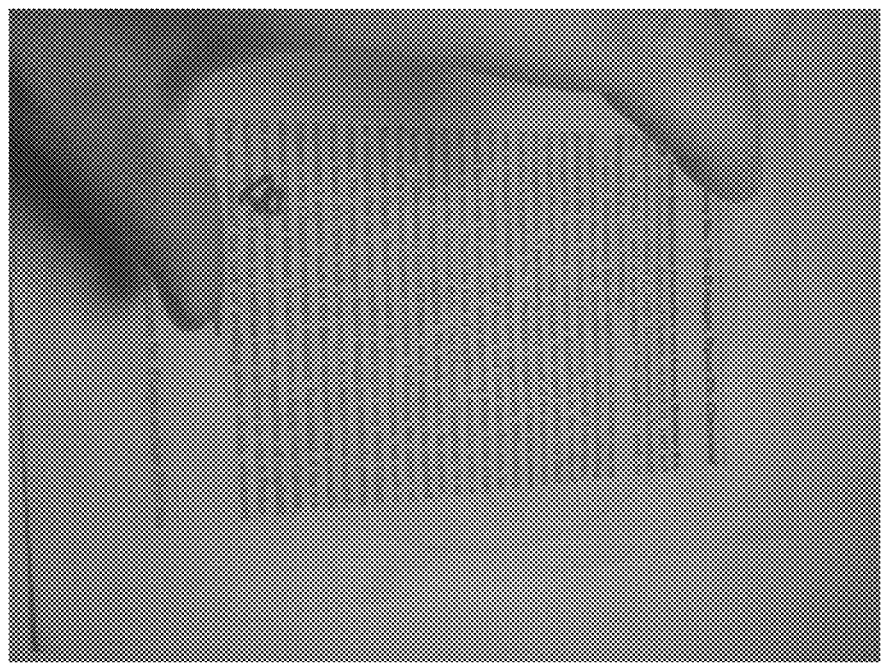

FIG. 5 shows as received borosilicate glass substrates (top) and nanotextured borosilicate glass substrates (bottom) is identical. The transparency of the glass wafers is unaffected by the nanoparticle shadow masked plasma etching treatments. This is because the characteristic length scale of the roughness is at least 40 times smaller than the wavelength of the transmitted visible light. No significant differences in transparency or anti-fogging performance were noted for the substrates fabricated with the 15 and 45 minute etch times.

Example 5

Chemical and Thermal Robustness and Anti-Fogging Effectiveness of Nanotextured Glass Wafers The chemical and thermal robustness and anti-fogging effectiveness of the nanotextured glass wafers was tested by soaks in various liquids such as water and organic solvents (e.g. acetone, methanol, and isopropyl alcohol) for periods of one week and longer. After these prolonged exposures, the wafers were rinsed with DI water and blown dry with nitrogen. Then, the water contact angle was re-measured. In all cases, the contact angle did not change, remaining zero (e.g. superhydrophilic, super high wettability).

The nanotextured wafers were also subjected to more than 48 hours in a sub-zero refrigerator at −79° C. The super high wettability, and in particular the superhydrophilic nature of the glass resulted in the rapid formation of frost on the nanotextured surfaces. However, after the wafers were thawed, the anti-fogging and super high wettability (e.g. superhydrophilic) nanotextured surface was completely unaffected by the freeze/thaw cycle as the post-freezing contact angle measurement remained 0°. Since the time of their original fabrication (more than six months), a subset of these nano-textured wafers were stored in fluoroware containers in a regular laboratory with an uncontrolled environment. We find that even after this time period, the anti-fogging performance of these wafers has not degraded. These combined results suggest that the super high wettability, and in particular superhydrophilic nanotextures are robust against temperature variations and aging (in the range tested)—likely because they are fabricated directly into the glass surface—in contrast to coatings and sprays.

In particular, FIG. 8 shows an exemplary black silicon wafer formed by plasma etching in a fluorine plasma. The structure of this wafer is a series of nanostructures and is of super high wettability, an in particular is superhydrophilic as fabricated, that is, the surface energy is naturally hydrophilic and the nanostructures provide the surface with superhydrophilicity by increasing wettability. In particular, FIGS. 8A-B show pictures the same nanostructured template with different coatings. The nanostructured template pictured in FIG. 8A is coated with polycrystalline titanium oxide and the nanostructured template pictured in FIG. 8B is coated with amorphous titanium oxide. The surfaces in FIGS. 8A-B are coated using atomic layer deposition (ALD) to provide a conformal coating.

FIG. 9 shows pictures of a nanostructured surface with a $TiO_2$ coating. A water droplet was placed on the surface as shown in 9A and after a few seconds, the droplet begins to wet the surface as shown in 9B, illustrating an exemplary method of controlling a rate of wetting by providing a coating which exhibits a low wettability (e.g. hydrophobic) on a nanostructure surface. The nanostructured surface without a coating is of a high wettability (e.g. hydrophilic); the coating on a flat (i.e. non-nanostructured) surface exhibits a low wettability (e.g. hydrophobic). When the surface having a high wettability (e.g. hydrophilic) nanostructured surface is coated with a coating having a low wettability (e.g. hydrophobic), the result of the opposing wettabilities leads to a surface that is still exhibits wettability but wetting of the surface occurs at a slower rate.

In particular, FIG. 9A shows photographs of a water droplet on a nanostructured surface at two time points. The nanostructured surface comprises a substrate material which exhibits low wettability, and with respect to water, is hydrophobic; accordingly, when a droplet of water is placed on the surfaces, the water droplet sits on top of the surface and exhibits a high contact angle with respect to the surface. However, over time, as shown in FIG. 9B, the contact angle of the water droplet with respect to the surface decreases, the droplet wets the surface. Thus FIGS. 9A-B show and exemplary control of a rate of wetting. The photograph in FIG. 9B was taken approximately three seconds after the photograph shown in FIG. 9A.

Thus, the pictures in FIG. 9 illustrate control of the rate at which wetting occurs which is manifested as an apparent disappearance of the water drop over the course of a few seconds as the drop wets the surface. In particular, the coating that was used on the nanostructured surface pictured in FIG. 9 is what allowed the rate of wetting to be controlled and the nanostructuring on the surface is what determined whether or not the surface was wetting. More particularly, the surface energy of the coating is what controlled the rate at which wetting occurred.

FIG. 10 shows a time lapse of the same surface shown in FIG. 9 rotated 90° demonstrating stickiness of a water droplet.

Example 6

An Expected Method for Nanotexturing a Sapphire Surface

The following example can be carried out in a similar manner as Example 1, but with a different substrate, nanoparticle, and etchant as follows. Sapphire is selected as a substrate for nanotexturing along with a chlorine-based plasma etch. Silica nanoparticles are chosen to serve as a shadow masking agent in the patterning step because silica is resistant to chlorine attack. An aqueous dispersion of silica nanoparticles is applied onto a substrate and excess water was removed by spin-coating. The spin-coated sapphire is then etched by a chlorine-based plasma and after etching, the nanoparticles are removed by rinsing and sonicating in DI water. This method can yield a superhydrophilic sapphire surface being inherently antifogging.

Example 7

An Expected Method for Nanotexturing a Fluoride-Based Optic

The following example can be carried out in a similar manner as Example 1, but with a different substrate, nanoparticle, and etchant as follows. A fluoride-based optic is selected as a substrate for nanotexturing along with an argon-ion physical etch. Metal nanoparticles are chosen to serve as a shadow masking agent in the patterning step because metal particles are more resistant to an argon-ion sputter etch attack. An aqueous dispersion of metal nanoparticles is applied onto the fluoride-based optic and excess water is removed by spin-coating. The spin-coated fluoride-based optic is then etched by a physical argon-ion etch, and after etching, the metal nanoparticles are removed by rinsing and sonicating in DI water.

Example 8

An Expected Method for Nanotexturing a Metal Surface

The following example can be carried out in a similar manner as Example 1, but with a different substrate, nanoparticle, and etchant as follows. A metal surface is selected as a substrate for nanotexturing along with a fluorine or chlorine-based plasma etch or acid wet chemical (e.g. HCl), and a halogen can be selected depending on the type of nanoparticle. Oxide nanoparticles (e.g. silicon or aluminium oxide nanoparticles) are chosen to serve as a shadow masking agent in the patterning step because oxide nanoparticles are resistant to a fluorine or chlorine-based plasma etch or a wet chemical etch with HCl. An aqueous dispersion of oxide nanoparticles is applied onto the metal surface and excess water is removed by spin-coating. The spin-coated metal is then etched by a fluorine or chlorine-based plasma etch or an acid wet chemical etch or acid wet chemical etch (e.g. HCl), and after etching, the nanoparticles are removed by rinsing and sonicating in DI water.

The above examples show that introducing nano-scale topologies into glass surfaces can lead to alterations in liquid-solid contact angles as compared with as-received glass, which are can be stable down to temperatures of −79° C. and after exposure to multiple chemicals. This nanoparticle-based patterning method of the disclosure can yield a surface having super high wettability and in particular, is superhydrophilic, thus providing an anti-fogging surface whose performance does not degrade over time or when the glass is subjected to temperature cycles and solvents.

This nanostructuring technique can be applied to many different kinds of optical and structural materials (e.g. aluminium, stainless steel, and nickel) and can offer precise, tunable control of surface wettability (e.g. hydrophilicity and hydrophobicity), eliciting desirable properties like anti-fogging, and, in the case of super low wettability (e.g. superhydrophobic) surfaces, anti-fouling and anti-frosting without loss of optical transparency.

Example 9

Fabrication of Copper Nanostructures

Copper pillar template were fabricated and coated using atomic layer deposition (ALD) using a $TiO_2$ coating to strength pillar templates (20% increase). Some atomic deposition conditions found to create copper nanotubes due to eutectic that forms ($Cu_3Ti$) at roughly 350° C. In this process, copper is consumed into an outer diameter of a shell.

A method for fabricating copper nanopipes from copper nanopillars comprises performing an ALD coating of a copper nanopillar at a particular temperature. For example, the coating can be a $TiO_2$ coating. In particular, with respect to a $TiO_2$ coating, performing a deposition of $TiO_2$ at approximately 350° C. can provide a copper titanium annulus (i.e. a hollow pillar) whereas performing a deposition of $TiO_2$ at approximately 200° C. can provide $TiO_2$ coated nanopipe. A copper nanopipe, compared to a corresponding nanopillar, can be stronger and more brittle. Fabrication of the copper nanopillars can also be performed parallel to a surface followed by $TiO_2$ ALD coating at 350° C. to provide a copper pipe.

Thus a deposition temperature of 200° C. for ALD coating of $TiO_2$ can be used to strengthen copper nanostructures and a deposition temperature of 350° C. ALD coating of $TiO_2$ can be used to fabricate copper pipes. Tubes can be positioned at will and a hollow tube is formed where original pillar diameter is now inner diameter of the tube. The technique works for tubes having an outer diameter of up to at least approximately 700 nm. The technique is also compatible with fully fabricated integrated circuits due to low temperature (350° C.).

The examples set forth above are provided to give those of ordinary skill in the art a complete disclosure and description of how to make and use the embodiments of the arrangements, devices, compositions, systems and methods of the disclosure, and are not intended to limit the scope of what the inventors regard as their disclosure. All patents and publications mentioned in the specification are indicative of the levels of skill of those skilled in the art to which the disclosure pertains.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

REFERENCES

[1] Y. Liu, X. Chen, and J. H. Xin. 17 Nanotechnology (2006) 3259.
[2] N. J. Shirtcliffe, G. McHale, M. I. Newton, C. C. Perry, and P. Roach Chem. Commun. (2005) 3135.
[3] G. McHale, N. J. Shirtcliffe, S. Aqil, C. C. Perry, and M. I. Netwon 93 Phys. Reve. Lett. (2004) 036102-1.
[4] F. C. Cebeci, Z. Wu, L. Zhai, R. E. Cohen, and M. F. Rubner 22 Langmuir (2006) 2856.
[5] Z. Gemici, H. Shimomura, R. E. Cohen, and M. F. Rubner 24 Langmuir (2008) 2168.
[6] X. V. Jokinen, L. Sainiemi, and S. Franssila 20 Adv. Mater. (2008) 3453.
[7] G. N. Parsons "ALD and Abrupt Wetting Transitions on Nonwoven Polypropylene and Woven Cotton Fabrics" ALD Conference 2009.
[8] Y. Liu, X. Chen, and J. H. Xin, "Can Superhydrophic Surfaces Repel Hot Water?," 19 Journal of Materials Chemistry 5602-5611 (2009)
[9] H. Zhang, R Lamb, J. Lewis, Sci. Technol. Adv. Mater. 2005 6 236.
[10] B J Kim, M. Mastro, H. Jung, H Y Kim, S. H. Kim, R. T. Holm, J. Hite, C. R. Eddy Jr., J. Bang, and J. Kim, Thin Solid Films 516 (2008) 7744-7747
[11] L. Sainiemi, T. Nissila, V. Jokinin, T. Sikanen, T. Kotiaho, R. Kostiainen, R. A. Ketola, and S. Franssila. *Sensors and Actuators B*. 132. (2008) 380.
[12] J. P. Hulme, J. Gwak, and Y. Miyahara. 128 *J. Am. Chem. Soc.* (2006) 390.
[13] Y. S. Kim, H. H. Lee, and P. Hammond. 14 *Nanotechnology* (2003) 1140.
[14] S. Y. Chou, P. Kraus, and P. Renstrom. *Appl. Phys. Lett.* 67 (1995) 3114.
[15] M Y Ye, X F Yin, and Z L Fang, *Anal. Bioanl. Chem.* 381 (2005): 820.
[16] X. C. Shan, T. Ikehara, Y. Murakoshi, and R. Maeda. *Sensors and Actuators A*. 119 (2005) 433.
[17] X. M. Telgarsky, I. Simdikova, I. Sbarski, E. Harvey, and A. Kueper. 27 (2004) 100.
[18] Microdevices Laboratory Annual Report 2008. www.jpl.nasa.gov
[19] P. A. Willis, F. Greer, M. C. Lee, J. A. Smith, V. E. White, F. Grunthaner, J. J. Sprague, and J. Rolland. *Lab Chip* 8 (2008) 1024.
[20] T. M. Mayer, J. W. Elam, S. M. George, P. G. Kotula, and R. S. Goeke. 82 *Appl. Phys. Lett.* 2883.
[21] M. Putkonen, BeneqOy "Atomic Layer Deposition of Metal Fluoride Thin Films Through Oxide Chemistry' ALD Conference 2009.
[22] G. N. Parsons "ALD and Abrupt Wetting Transitions on Nonwoven Polypropylene and Woven Cotton Fabrics" ALD Conference 2009.
[23] M. Lundgren, et al. *Langmuir* 2003, 19, 7127-9.
[24] Jeong, S.; Hu, L.; Lee, H. R.; Garnett, E.; Choi, J. W.; Cui, Y. *Nanoletters* 2010, 10, 2989-2994.
[25] Greer, J. R., Oliver, W. C., and Nix, W. D. "Size Effects in Mechanical Properties of Gold at the Micron Scale in the Absence of Strain Gradients", *Acta Materialia*, 53, 6, 2005.

The invention claimed is:

1. A method to control wetting characteristics of a nanostructured surface, the method comprising:
    forming a nanostructured surface comprising a plurality of nanostructures, the nanostructured surface defining a nanostructured space between the nanostructures; and
    controlling structural parameters of the nanostructured surface to control wetting characteristics of the nanostructured surface with respect to a fluid adapted to interact with the nanostructured surface, the structural parameters including one or more of a nanostructure width, nanostructure inclination angle or curvature, nanostructure height, distance between nanostructures, roughness of nanostructure walls, and nanostructured bridging elements between the nanostructures,
    wherein, upon the controlling of the structural parameters of the nanostructured surface, the fluid interacts with the nanostructured surface according to a desired interaction between the fluid and the nanostructured surface, the desired interaction between the fluid and the nanostructured surface is selected from the group consisting of:
    a first wetting characteristic resulting in droplet formation on the nanostructured surface while substantially avoiding lodging of the fluid within the nanostructured space with subsequent expulsion or evaporation of the fluid from the nanostructured space,
    a second wetting characteristic resulting in initial lodging of the fluid within the nanostructured space with subsequent expulsion or evaporation of the fluid from the nanostructured space, and
    a third wetting characteristic resulting in initial lodging of the fluid within the nanostructured space with subsequent expulsion or evaporation of the fluid from the nanostructured space, the lodging occurring at a slower rate than a rate of the second wetting characteristic.

2. The method of claim 1, wherein the structural parameters are selected based on a desired contact angle of the fluid, upon contact of the fluid with the nanostructured surface.

3. The method of claim 1, wherein the nanostructures are made of the same material as the nanostructured surface.

4. The method of claim 1, wherein the nanostructured surface is a glass nanostructured surface.

5. The method of claim 4, wherein the glass nanostructured surface is made of a metallic glass or a silicon based glass material selected the group consisting of: boro-, fluoro-,phospho-, borophospho-, fused silica, and alumino-silicate.

6. The method of claim 1, wherein forming the nanostructured surface occurs through a fluorine-based plasma etch.

7. The method of claim 1, wherein the nanostructured surface comprises aluminum oxide.

8. The method of claim 1, wherein the fluid is a liquid.

9. The method of claim 1, wherein the nanostructure walls are roughened nanostructure walls.

10. The method of claim 9, wherein the roughened nanostructure walls are made of a same material of the nanostructure.

11. The method of claim 9, wherein the roughened nanostructure walls are made of a material different from a material of the nanostructure.

12. The method of claim 1, wherein the nanostructures are substantially pointed nanostructures.

13. The method of claim 12, wherein the substantially pointed nanostructures are substantially cone-shaped nanostructures.

14. The method of claim 12, wherein the substantially pointed nanostructures are substantially cuspidal nanostructures.

15. The method of claim 12, wherein the substantially pointed nanostructures are substantially pointed arch nanostructures.

16. The method of claim 1, wherein the nanostructures are substantially pillar-shaped nanostructures.

17. The method of claim 16, wherein the substantially pillar-shaped nanostructures comprise concave or convex walls.

18. The method of claim 1, wherein the structural parameters are controlled to allow light in a selected wavelength range to pass through the nanostructured surface in an unscattered fashion.

19. The method of claim 18, wherein the distance between the nanostructures is controlled to be less than a shortest wavelength of the wavelength range.

20. The method of claim 19, wherein the distance between the nanostructures is one tenth of the shortest wavelength of the wavelength range.

21. The method of claim 19, wherein the distance between the nanostructures is in a range of 0.1-400 nm and the selected wavelength range is greater than 400 nm.

22. The method of claim 8, wherein the liquid is selected from the group consisting of: water and high molecular weight oil.

23. The method of claim 1, wherein the nanostructure height is in the range of 5 nm-1 micron the nanostructure inclination angle or curvature is in the range of 0-70°, and the distance between the nanostructures in the range of 0.1 angstrom-400 nm.

24. The method of claim 1, further comprising controlling environmental parameters including one or more of: atmosphere associated with the fluid and the nanostructured surface, temperature of the nanostructured surface, temperature of the atmosphere and identity and composition of one or more gases in the atmosphere, wherein upon controlling the desired environmental parameters for the fluid, surface free energy of an interface between the fluid and the one or more gases contributes to the first wetting characteristic, the second wetting characteristic, or the third wetting characteristic.

25. The method of claim 1, wherein the nanostructured surface is a window surface, a windshield surface, or goggles' surface and the fluid is water in one or more physical states, wherein the windshield or goggles are adapted to repel the water when the nanostructured surface is in the first wetting characteristic.

26. The method of claim 1, wherein the nanostructured surface is a window surface, a windshield surface, or goggles' surface and the fluid is water in one or more physical states, wherein the windshield or goggles are adapted to be wetted when the nanostructured surface is in the second wetting characteristic and/or third wetting characteristic.

27. A method for fabricating a nanostructured surface, the method comprising:
providing a substrate;
depositing an etch mask on the substrate, the etch mask comprising nanoparticles;
etching the substrate under etching conditions to form a plurality of nanostructures, and
removing the etch mask to expose the plurality of nanostructures, a size of the nanoparticles being selected based on desired structural parameters, thus obtaining a nanostructured surface,
wherein:
the structural parameters include one or more of a nanostructure width, nanostructure inclination angle or curvature, nanostructure height, or distance between nanostructures, and
the structural parameters are selected based on a desired contact angle of a fluid with the nanostructured surface.

28. The method according to claim 27, wherein the nanoparticles and the etching conditions are selected such that an etch rate of the etch mask is less than an etch rate of the substrate under the etching conditions.

29. The method according to claim 27, further comprising controlling the distance between the nanostructures by increasing or decreasing an amount of the nanoparticles per unit area on the substrate.

30. The method according to claim 27, wherein a ratio of the etch rate of the substrate to the etch rate of the etch mask is greater than 10.

31. The method according to claim 27, wherein the substrate comprises aluminum oxide and the nanoparticles comprise silica.

32. The method according to claim 27, wherein the substrate comprises borosilicate and the nanoparticles comprise aluminum oxide.

33. The method according to claim 27, wherein the substrate is a fluoride-based optic and the nanoparticles are made of metal, the metal selected from the group consisting of: platinum, palladium, gold, and metals having low sputtering rates.

34. The method according to claim 27, wherein the substrate is made of metal and the nanoparticles are aluminum oxide or silicon oxide nanoparticles, the metal selected from the group consisting of aluminum, stainless steel, nickel, and other structural materials.

35. The method according to claim 27, wherein the substrate is a surface selected from the group consisting of: a transparent optical material, a window, a windshield, a boat hull, lenses, aircraft, goggles, eyeglasses, mirrors, heat exchangers, steam turbines, and hydroelectric turbines.

36. A method to control wetting characteristics of a nanostructured surface, the method comprising:
forming a nanostructured surface comprising a plurality of nanostructures; and
controlling structural parameters of the nanostructured surface to control wetting characteristics of the nanostructured surface with respect to a fluid interacting with the nanostructured surface, the structural parameters including one or more of a nanostructure width, nanostructure inclination angle or curvature, nanostructure height, distance between nanostructures, roughness of nanostructure walls, and nanostructured bridging elements between the nanostructures,
wherein, upon the controlling of the structural parameters of the nanostructured surface, the fluid forms a desired contact angle to the nanostructured surface, wherein the desired contact angle is controlled to be between 0 and 120 degrees.

37. The method of claim 18, wherein the selected wavelength range is between 400 and 700 nm.

* * * * *